(12) United States Patent
Paryani et al.

(10) Patent No.: US 10,286,793 B2
(45) Date of Patent: May 14, 2019

(54) AUTONOMOUS VEHICLE CHARGING STATION CONNECTION

(71) Applicant: Faraday & Future Inc., Gardena, CA (US)

(72) Inventors: Anil Paryani, Cerritos, CA (US); Boaz Jie Chai, Mountain View, CA (US); Evan Roger Fischer, Torrance, CA (US)

(73) Assignee: FARADAY & FUTURE INC., Gardena, CA (US)

( * ) Notice: Subject to any disclaimer, the term of this patent is extended or adjusted under 35 U.S.C. 154(b) by 196 days.

(21) Appl. No.: 15/060,218

(22) Filed: Mar. 3, 2016

(65) Prior Publication Data
US 2017/0225578 A1     Aug. 10, 2017

Related U.S. Application Data

(63) Continuation-in-part of application No. 15/017,491, filed on Feb. 5, 2016, now Pat. No. 10,071,645.

(51) Int. Cl.
*B60L 11/18* (2006.01)

(52) U.S. Cl.
CPC ......... *B60L 11/1818* (2013.01); *B60L 11/185* (2013.01); *B60L 11/1825* (2013.01); *B60L 11/1827* (2013.01); *B60L 11/1833* (2013.01); *B60L 11/1838* (2013.01); *B60L 2230/10* (2013.01); *Y02T 10/7005* (2013.01); *Y02T 10/7088* (2013.01); *Y02T 90/121* (2013.01); *Y02T 90/125* (2013.01); *Y02T 90/128* (2013.01); *Y02T 90/14* (2013.01)

(58) Field of Classification Search
CPC .............. B60L 11/1827; B60L 11/1818; B60L 11/1825; B60L 11/1833; B60L 11/185; B60L 11/1838; B60L 2230/10; Y02T 90/125; Y02T 10/7088; Y02T 90/121; Y02T 90/14; Y02T 90/128; Y02T 10/7005
See application file for complete search history.

(56) References Cited

U.S. PATENT DOCUMENTS

| | | | |
|---|---|---|---|
| 5,879,833 A | 3/1999 | Yoshii et al. | |
| 6,194,854 B1 * | 2/2001 | Uchibori | B60L 11/1816 318/139 |
| 7,999,506 B1 * | 8/2011 | Hollar | B60L 11/1818 320/104 |
| 8,057,928 B2 | 11/2011 | Kohn et al. | |
| 8,890,475 B1 * | 11/2014 | Becker | B60L 11/1827 180/65.29 |
| 9,056,555 B1 * | 6/2015 | Zhou | B60L 11/1827 |
| 9,770,993 B2 * | 9/2017 | Zhao | B60L 11/1846 |
| 2001/0046624 A1 | 11/2001 | Goto et al. | |
| 2008/0138698 A1 | 6/2008 | Ogami et al. | |
| 2009/0023059 A1 | 1/2009 | Kinoshita et al. | |

(Continued)

*Primary Examiner* — Nha T Nguyen
(74) *Attorney, Agent, or Firm* — Knobbe Martens Olson & Bear LLP

(57) ABSTRACT

A charging station can be autonomously coupled to an electric vehicle. Sensors on the vehicle determine a location of the vehicle, and the vehicle is positioned within a connection envelope. A travel path for bringing a charging connector into contact with a charging port on the vehicle can be determined, and then the travel path is autonomously carried out. A charging station may include a mount, a bracket, and a charging connection.

4 Claims, 19 Drawing Sheets

(56) References Cited

U.S. PATENT DOCUMENTS

| | | |
|---|---|---|
| 2010/0047682 A1 | 2/2010 | Houchin-Miller et al. |
| 2010/0201309 A1* | 8/2010 | Meek .................. B60L 11/1816 320/108 |
| 2011/0077809 A1* | 3/2011 | Leary .................. B60L 11/1824 701/22 |
| 2011/0148350 A1* | 6/2011 | Wegener ............... B60L 11/182 320/108 |
| 2013/0076902 A1* | 3/2013 | Gao ........................ B25J 9/042 348/148 |
| 2013/0193918 A1 | 8/2013 | Sarkar et al. |
| 2014/0354229 A1* | 12/2014 | Zhao .................. B60L 11/1846 320/109 |
| 2015/0042278 A1* | 2/2015 | Leary .................. B60L 11/1824 320/109 |
| 2015/0097529 A1* | 4/2015 | Lacour ................ B60L 11/1818 320/109 |
| 2016/0272074 A1 | 9/2016 | McGrath et al. |
| 2016/0332525 A1* | 11/2016 | Kufner ............... H01R 13/6315 |
| 2017/0008412 A1* | 1/2017 | Wu ..................... B60L 11/1835 |
| 2017/0050526 A1* | 2/2017 | Sommarstrom ......... B67D 9/02 |
| 2017/0166070 A1* | 6/2017 | Dunger ................ B60L 11/1818 |
| 2017/0166071 A1* | 6/2017 | Tajima ................ B60L 11/1827 |
| 2017/0210237 A1* | 7/2017 | Buehs ................ B60L 11/1827 |
| 2017/0291497 A1* | 10/2017 | Daniel ................ B60L 11/1827 |

\* cited by examiner

AUTONOMOUS VEHICLE CHARGING STATION CONNECTION

RELATED APPLICATIONS

This application is a continuation-in-part of U.S. patent application Ser. No. 15/017,491, filed on 5 Feb. 2016, entitled "Autonomous Vehicle Charging Station Connection," which is hereby incorporated by reference in its entirety.

FIELD OF THE DISCLOSURE

The present disclosure relates generally to the field of vehicle charging systems, and more specifically to autonomously connecting vehicle charging systems.

BACKGROUND

Battery powered electric vehicles require periodic recharging. A charging station can comprise an electrical cable delivering electricity from a power source, and a charging connector or connection that is coupled to the cable. The connector can be coupled to a charging port on the car to deliver power to the batteries.

SUMMARY

The devices, systems, and methods disclosed herein have several features, no single one of which is solely responsible for its desirable attributes. Without limiting the scope as expressed by the claims that follow, its more prominent features will now be discussed briefly. After considering this discussion, and particularly after reading the section entitled "Detailed Description" one will understand how the features of the system and methods provide several advantages over traditional systems and methods.

In some implementations, a charging station for an electric vehicle includes a mount, a bracket, and mechanisms to move the mount and the bracket to a desired position. The mount may be configured to move in the longitudinal, lateral, and transverse directions. The bracket may be coupled to the mount. The bracket may be configured move independently with respect to the mount and to secure a charging connector in a fixed a position with respect to the bracket. In some aspects, the bracket is configured to move with respect to the movable mount in the longitudinal, lateral, and transverse directions. The bracket may be configured to move a fixed distance with respect to the movable mount in at least the lateral, longitudinal, and/or transverse directions. The bracket may be configured to rotate with respect to the movable mount about the longitudinal, lateral, and transverse axes. The bracket may be configured to rotate a fixed distance with respect to the movable mount. A charging connector may be secured at least partially within the bracket.

In some implementations, a charging station for an electric vehicle includes a mount configured to move in the longitudinal, lateral, and transverse directions. A charging connector may be secured to the mount with a coupling. The charging connector may be configured to couple with the vehicle's charge port. The coupling may be configured to permit the charging connector to move independently with respect to the mount. In some aspects, the mount includes an opening and the charging connector is secured within the opening by a plurality of spring couplings. The coupling may be configured to permit the charging connector to move a fixed distance in the longitudinal direction with respect to the mount.

In some implementations, a charging station for an electric vehicle includes a mount configured to move in the longitudinal, lateral, and transverse directions, a bracket coupled to the mount, the bracket configured move independently with respect to the mount, and a charging connector secured by the bracket in a fixed position with respect to the bracket and movable with respect to the mount. In some aspects, the charging station includes one or more actuators coupled to the mount by one or more arms. The charging station may include circuitry for controlling the one or more actuators.

BRIEF DESCRIPTION OF THE DRAWINGS

The following is a brief description of each of the drawings. From figure to figure, the same reference numerals have been used to designate the same components of an illustrated embodiment. The drawings disclose illustrative embodiments and particularly illustrative implementations in the context of electric vehicles, such as hybrid and/or electric automobiles. They do not set forth all embodiments. Other embodiments may be used in addition to or instead. Conversely, some embodiments may be practiced without all of the details that are disclosed. Moreover, it is to be noted that the figures provided herein are not drawn to any particular proportion or scale, and that many variations can be made to the illustrated embodiments.

DETAILED DESCRIPTION

Figure 1:
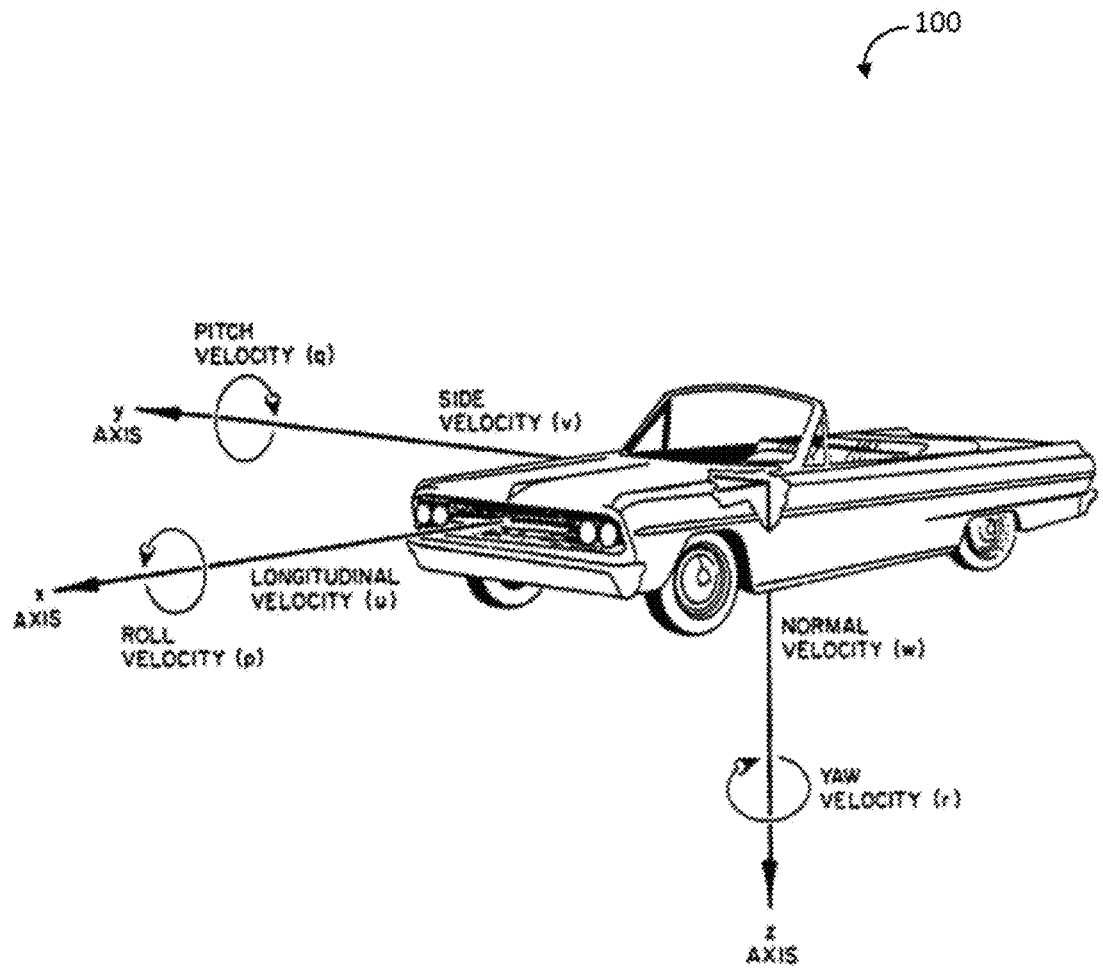
FIG. 1 is a perspective view of a vehicle and an x-axis, a y-axis and a z-axis of the vehicle according to various embodiments.

Battery powered electric vehicles (EV's) require periodic charging to replenish the charge on batteries. As used herein, the term "electric vehicle" and "EV" can refer to any vehicle that is partly ("hybrid vehicle") or entirely operated based on stored electric power. Such vehicles can include, for example, road vehicles (cars, trucks, motorcycles, buses, etc.), rail vehicles, underwater vessels, electric aircraft, and electric spacecraft.

An EV charging station can be connected to an electric grid or other electricity generating device as a source of electric energy. Charging stations can comprise a standard residential 120 volt Alternating Current (AC) electrical socket that connects to the vehicle by a cable with a standard electrical plug at one end for connecting to the residential socket, and a vehicle-specific connector at the other end for connecting to the EV. Household chargers utilizing 240 volt AC can also be installed to reduce charging time. Commercial and government-operated charging stations can also utilize 120 volt and 240 volt AC, or can utilize a Direct Current (DC) Fast Charge system of up to 500 volts.

In manual charging systems, in order to recharge a vehicle's power source, the operator of the vehicle may have to handle a high-voltage cable or charging connector. The handling of such cables and/or connectors may be inconvenient and/or may be dangerous, during darkness or inclement weather. The cables and/or connectors may be relatively heavy and/or cumbersome to maneuver. Connectors often require an amount of force to couple and uncouple together. This may be difficult for some operators. Accordingly, in some embodiments, a charging station may be configured to autonomously couple to a vehicle's charging port. The present disclosure may provide a robust and inexpensive solution for autonomously coupling a charging connector to a vehicle's charge port.

In some implementations, the charging station includes a movable frame. The movable frame may be configured to move in the longitudinal, lateral and/or transverse directions. The movable frame may be configured to hold a mount. The mount may be configured to hold a bracket. The bracket may be configured to hold a charging connector. The charging connector may include a handle, a plug, and a cable.

The mount and/or bracket may allow the charging connector to move with respect to the mount and/or with respect to the frame. In some aspects, the bracket may allow for the charging connector to be removably coupled to the bracket. The mount and/or bracket may allow for the charging connector to move in every direction with respect to the mount and/or the frame while preventing the charging connector form moving with respect to the bracket. For example, the mount and/or bracket may be configured to allow the charging connector to rotate plus or minus three to five degrees in every direction with respect to the mount and/or the frame. In some aspects, the mount and/or bracket may prevent relative motion between the bracket and the mount (and/or the frame) to help prevent accidental uncoupling of the charging connector from the charge port. In some aspects, the mount and/or bracket may limit and/or dampen the rotational and/or axial motion of the charging connector with respect to the mount and/or frame. The bracket and/or mount may allow for a certain amount of play between the charging connector and the charging port. In this way, a perfect alignment between the charging connector and the charge port may not be required. That is to say, the mount and/or bracket may be designed such that the charge port has added dexterity to ease the automatic coupling and uncoupling of a charging connection to a vehicle's charge port.

When the charging occurs outdoors (e.g., in the EV owner's driveway or at a public roadside or parking lot road station), weather conditions can make it difficult to connect the charger to the EV. During very cold periods, for example, a driver may be wearing gloves making it difficult to access the charger, grab hold of the cable and connector, open an access door on the EV charging port, and connect the cable to the charging port. Similarly, rain and snow conditions can make the connection procedure undesirable. Even if the EV owner has a charging station within a home garage, space limitations, and everyday clutter in the garage can make access to the charging station and EV charging port difficult and tedious. Time limitations can also make the connection procedure undesirable when the driver is in a hurry and does not have time to connect the charging station to the EV. A system that would automatically connect the charging station to the charging port would solve many of these problems. A fairly substantial force may be required to connect and disconnect the charging connection to the vehicle's charge port. Such force may be difficult for the elderly or disabled. It may be further desirable that such automatic connecting system be robust and inexpensive.

Various embodiments of an autonomous charging station can comprise movement in any direction within a three-dimensional space defined by an x-axis, a y-axis, and a z-axis. For ease of reference and consistence throughout the present disclosure, FIG. 1 illustrates the orientation of the x-axis, y-axis, and z-axis with reference to a vehicle 100. The x-axis represents movement forward and backward along a direction of travel of the vehicle 100; the y-axis represents movement to the right and left normal to the direction of travel of the vehicle 100; and the z-axis represents movement up and down normal to the plane defined by the road surface (or other surface) on which the vehicle 100 travels. The x-axis may also be referred to as the "longitudinal axis." The y-axis may also be referred to as the "lateral axis." The z-axis may also be referred to as the "transverse axis." The "longitudinal direction" may refer to a direction substantially parallel to the longitudinal axis; the "lateral direction" may refer to a direction substantially parallel to the lateral axis; and the "transverse direction" may refer to a direction substantially parallel to the transverse axis.

Figure 2:
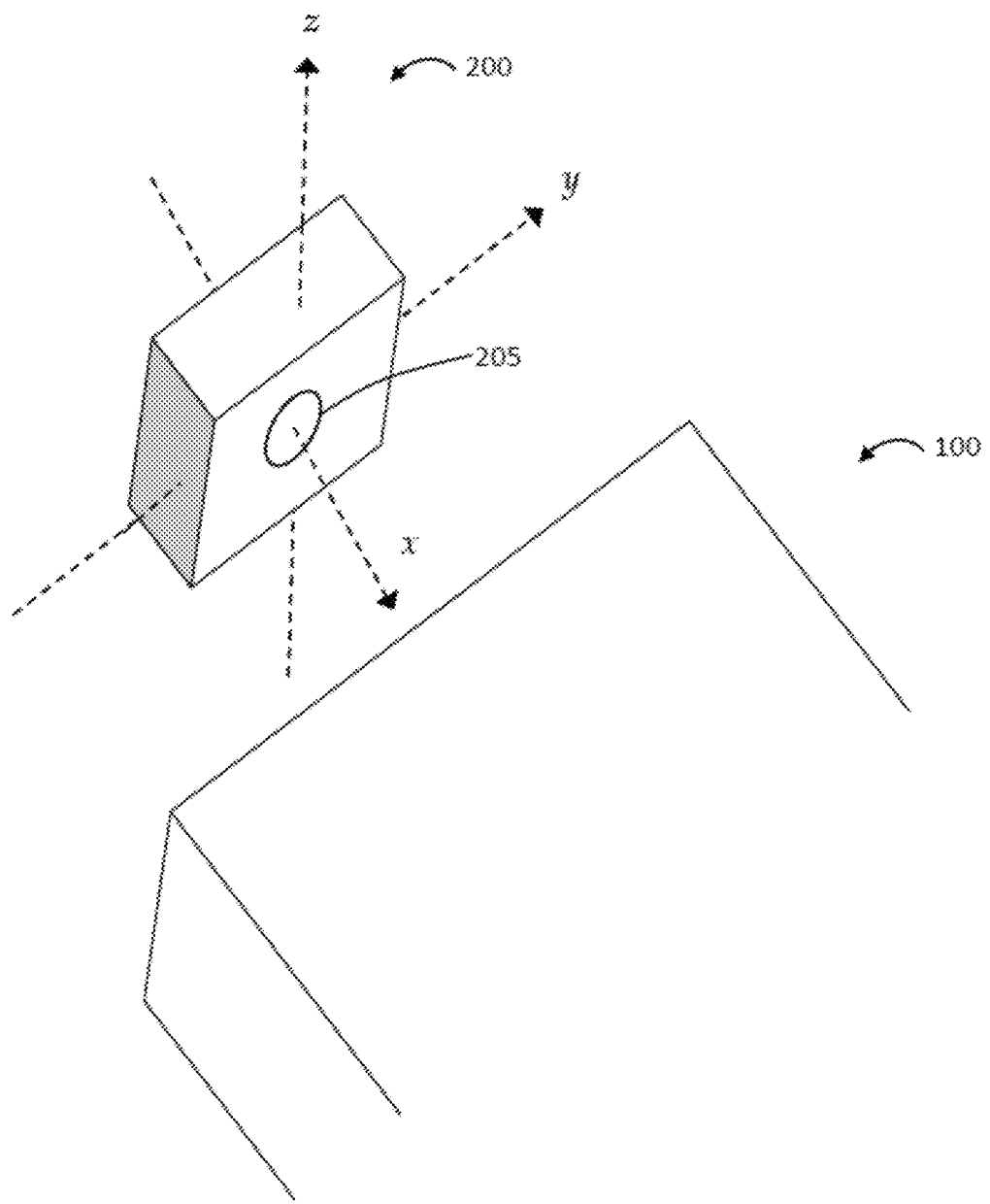
FIG. 2 is a schematic diagram of a vehicle in proximity to a charging station according to various embodiments.
Figure 3:
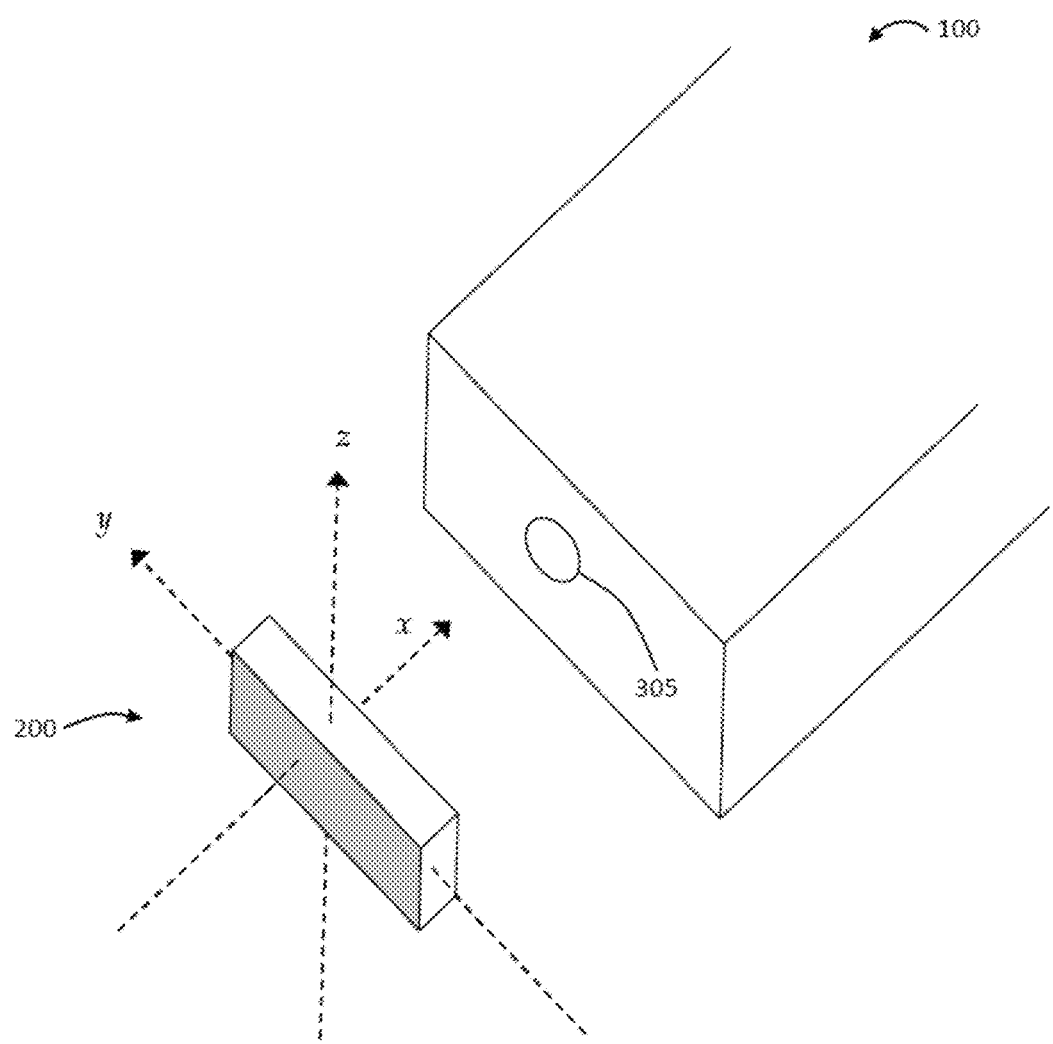
FIG. 3 is a further schematic diagram of a vehicle in proximity to a charging station according to various embodiments.

FIG. 2 schematically illustrates the vehicle 100 in proximity to a charging station 200 from the perspective of the rear of the vehicle 100. FIG. 3 schematically illustrates the vehicle 100 and charging station 200 from the perspective of the front of the vehicle 100 according to various embodiments. The vehicle 100 can comprise a charging port 305. The charging station 200 can comprise a charging connector or connection 205. A desired result according to various embodiments can be the coupling and uncoupling of the charging connector 205 with the charging port 305. Such a connection can be accomplished by moving the charging connector 205 within the three-dimensional space defined by the x-axis, y-axis, and z-axis.

The terms "front" and "rear" as used herein are merely descriptive and are not limiting in any way. It is not to be implied that the charging port 305 can be located only on the front or rear of the vehicle 100. In actual practice, the charging port 305 can be located at any point on or within the vehicle 100 and any such location is within the scope of the present disclosure. The terms "upper," "lower," "top," "bottom," "underside," "upperside" and the like, which also are used to describe the disclosed methods, systems, and devices are generally used in reference to the illustrated orientation of the embodiment.

Figure 4:
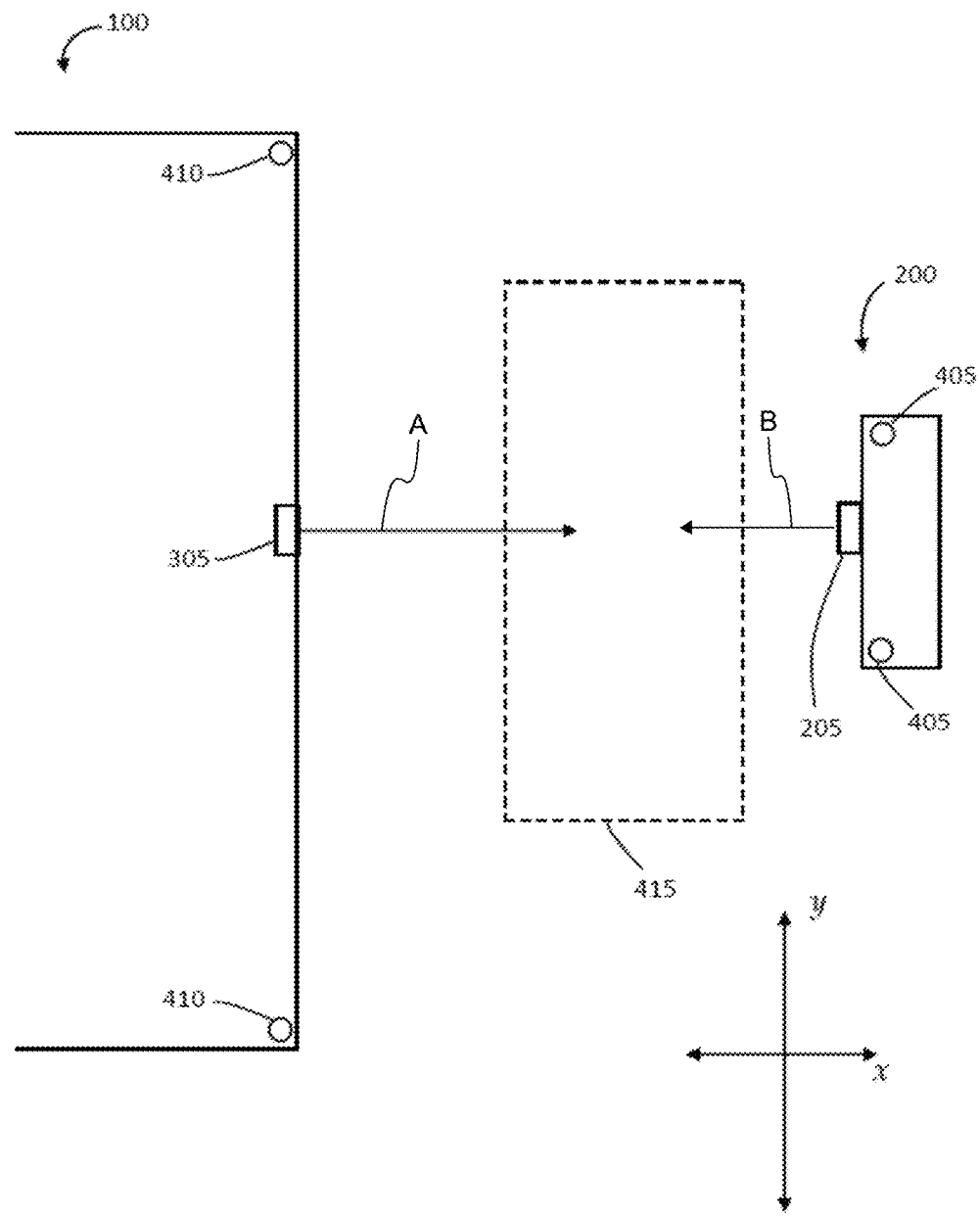
FIG. 4 is a schematic diagram of a top view of a connection envelope for connecting a charging station to a vehicle according to various embodiments.
Figure 5:
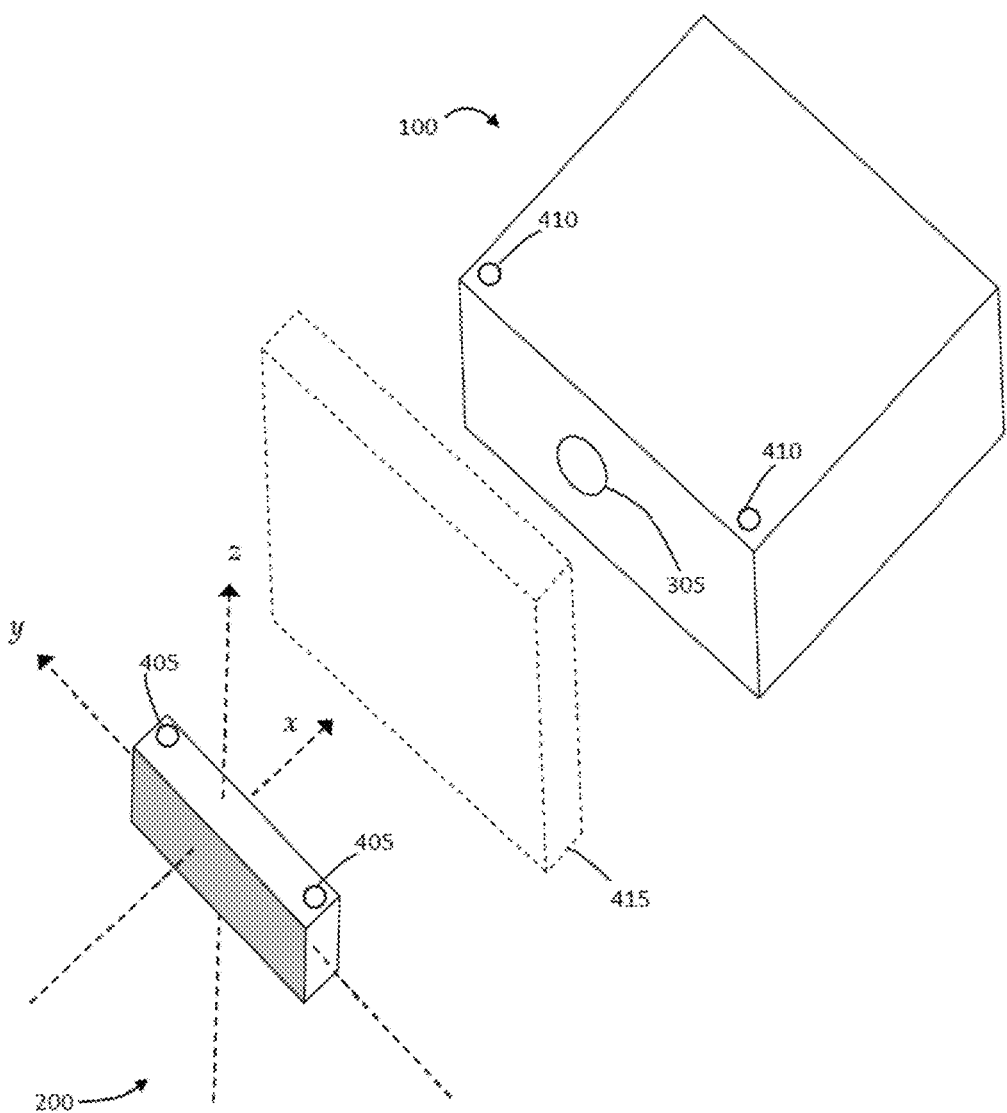
FIG. 5 is a perspective view of a connection envelope for connecting a charging station to a vehicle according to various embodiments.

In various embodiments, movement of the charging station 200 (or a portion of the charging station 200 comprising the charging connector 205) can be limited due to mechanical constraints. These limitations can define a connection envelope 415 as illustrated schematically in FIG. 4 according to various embodiments. In order for the charging connector 205 to couple with the charging port 305, the charging port 305 can be positioned within the connection envelope 415. FIG. 4 schematically illustrates an overhead view of the vehicle 100 and the charging station 200, and the connection envelope 415 therebetween. According to various embodiments, FIG. 5 schematically illustrates that the connection envelope 415 can be a 3-dimensional space. Although FIGS. 4 and 5 represent the connection envelope 415 as a rectangular block, the connection envelope 415 can be any shape, limited only by the mechanical movement constraints of the charging station 200. For example, the shape of the connection envelope 415 can be spherical, ovoid, curved, arched, and the like.

In some aspects, the charging port on the automobile may also be configured to move with respect to the vehicle. That is to say, the charging port may be configured to move in three-dimensional space with respect to the vehicle and into the connection envelope 415.

Figure 6:
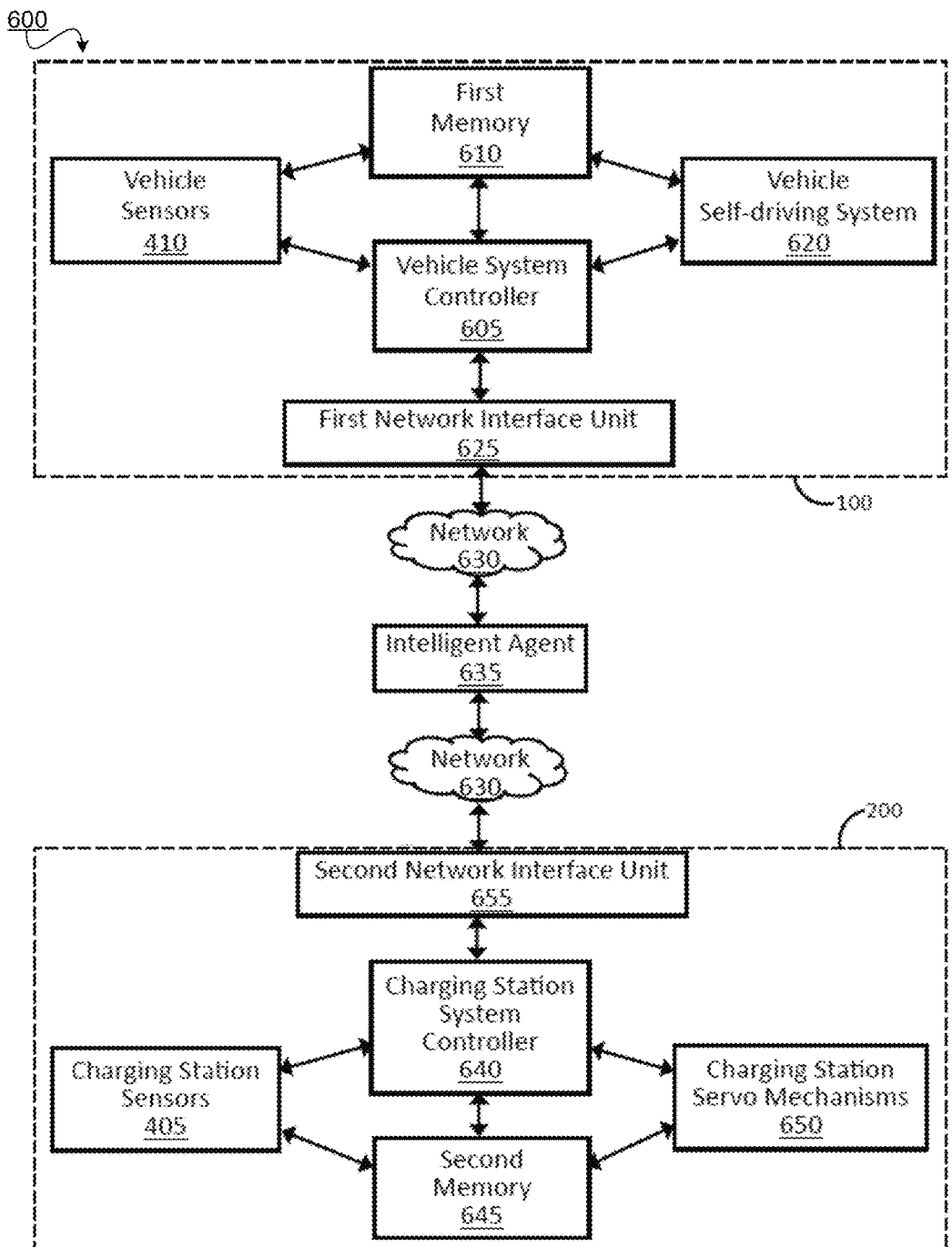
FIG. 6 is a schematic diagram of an exemplary system for autonomous connection of a charging station to a vehicle according to various embodiments.

Some embodiments, as illustrated in FIG. 6 along with FIGS. 1-5, can comprise an autonomous system 600 for coupling the charging station 200 to the vehicle 100. The vehicle 100 can comprise a vehicle system controller 605 communicatively coupled to a first memory 610, one or more vehicle sensors 410, and a vehicle self-driving system 620. The charging system 200 can comprise a charging station system controller 640 communicatively coupled to a second memory 645, one or more charging station sensors 405, and one or more charging station servo mechanisms 650. The charging station system controller 640 may comprise circuitry configured to determine the orientation of the charging connector 205 and/or other portions of the charging station using, for example, sensors 405. Such circuitry may also be configured to move the charging connector 205 by controlling, for example, one or more actuators or servo mechanisms 650.

Referring to FIG. 4, the vehicle 100 can be brought into proximity of the charging station 200, either through the efforts of the driver of the vehicle 100 or by the vehicle self-driving system 620. The vehicle 100 can further comprise a first network interface unit 625 communicatively coupled to the vehicle system controller 605, through which the vehicle system controller 605 can communicate via a network 630 with one or more intelligent agents 635. The network 630 can be a cellular network, the Internet, an Intranet, or other suitable communications network, and can be capable of supporting communication in accordance with any one or more of a number of protocols, such as general packet radio service (GPRS), Universal Mobile Telecommunications System (UMTS), Code Division Multiple Access 2000 (CDMA2000), CDMA2000 IX (1×RTT), Wideband Code Division Multiple Access (WCDMA), Global System for Mobile Communications (GSM), Enhanced Data rates for GSM Evolution (EDGE), Time Division-Synchronous Code Division Multiple Access (TD-SCDMA), Long Term Evolution (LTE), Evolved Universal Terrestrial Radio Access Network (E-UTRAN), Evolution-Data Optimized (EVDO), High Speed Packet Access (HSPA), High-Speed Downlink Packet Access (HSDPA), IEEE 802.11 (Wi-Fi), Wi-Fi Direct, 802.16 (WiMAX), ultra-wideband (UWB), infrared (IR) protocols, near field communication (NFC) protocols, Wibree, Bluetooth, Wireless LAN (WLAN) protocols/techniques.

The charging station 200 can further comprise a second network interface unit 655 communicatively coupled to the charging station system controller 640, through which the charging station system controller 640 can communicate via the network 630 with the one or more intelligent agents 635, thus allowing communication between the vehicle system controller 605 and the charging station system controller 640.

Each of the vehicle system controller 605 and the charging station system controller 640, according to various embodiments, can comprise a specialized chip, such as an ASIC chip, programmed with logic as described herein to operate the elements of the autonomous system 600. The programmed logic can comprise instructions for operating the vehicle 100 and the charging station 200 in response to one or more inputs.

Continuing with FIG. 4, the vehicle sensors 410 can comprise one or more locational sensors 410 to determine a location of the vehicle 100. The locational sensors 410 can be a global position system (GPS) sensor 410. The locational sensors 410 can also comprise ultrasonic emitters and receivers, magnetometers, cameras or other imaging devices, or the like. The vehicle system controller 605 can communicate the location of the vehicle 100 to the intelligent agent 635. The charging station 200 can comprise one or more sensors 405 that can comprise locational sensors 405, as described above, to determine a location of the charging station 200, a location of the charging connector 205, and boundaries of the connection envelope 415. The charging station system controller 640 can communicate the location of the charging station 200, the location of the charging connector 205, and boundaries of the connection envelope 415 to the intelligent agent 635.

The location of the vehicle can be stored in the first memory 610 or in the vehicle sensor 410. The location can be in the form of latitude and longitude coordinates, Universal Transverse Mercator (UTM) coordinates, Military Grid Reference System (MGRS) coordinates, United States National Grid (USNG) coordinates, Global Area Reference System (GARS) coordinates, World Geographic Reference System (GEOREF) coordinates, or any other geographic coordinate system.

The intelligent agent 635, using the location inputs from the vehicle system controller 605 and the charging station system controller 640, can determine one or more movements of the vehicle 100 (e.g., a first travel path indicated by a first arrow A in FIG. 4) to position the charging port 305 within the connection envelope 415. The intelligent agent 635 can communicate the first travel path to the vehicle system controller 605, which can then activate a self-driving mode of the vehicle self-driving system 620. The vehicle self-driving system 620, in conjunction with inputs from the vehicle sensors 410 and, in some embodiments, inputs from the charging station sensors 405, can carry out the first travel path and position the charging port 305 within the connection envelope 415.

Once the vehicle self-driving system 620 carries out the first travel path and brings the vehicle 100 to a stop and deactivates the vehicle self-driving system 620, the vehicle system controller 605 can receive further inputs from the vehicle sensors 410 to verify that the charging port 305 is positioned within the connection envelope 415. The vehicle system controller 605 then communicates the verification to the intelligent agent 635 along with the current location of the charging port 305 in 3-dimensional space within the connection envelope 415.

The charging station system controller 640 can receive input from the charging station sensors 405 and determine the location of the charging connector 205 and communicate the location to the intelligent agent 635. The input from the charging station sensors 405 may indicate a location relative to the connection envelope 415. Alternatively, the input from the charging station sensors 405 may indicate a location of the charging connector 205 with respect to other references, such as a global reference system provided by a GPS sensor. The charging station system controller 640 can then determine the location of the charging connector 205 relative to connection envelope 415 based on the input from the charging station sensor 405. The intelligent agent 635 can then determine one or movements of the charging station 200 or portion of the charging station 200 (e.g., a second travel path indicated by arrow B in FIG. 4) to position the charging connector 205 into contact with the charging port 305 within the connection envelope 415. The intelligent agent 635 can communicate the second travel path to the charging station system controller 640, which can then activate the one or more charging station servo mechanisms 650. The charging station servo mechanisms 650, in conjunction with inputs from the charging station sensors 405 and, in some embodiments, inputs from the vehicle sensors 410, can carry out the second travel path and position the charging connector 205 in contact with the charging port 305 within the connection envelope 415.

The vehicle system controller 605 can receive inputs from the vehicle sensors 410, and the charging station system controller 640 can receive inputs from the charging station sensors 405 to verify the connection between the charging connector 205 and the charging port 305. The verification can be communicated to the intelligent agent 635, which can initiate charging of the batteries in the vehicle 100. Once the charging is complete, the vehicle sensors 410 can send a signal to the vehicle system controller 605 verifying the completion of a charging cycle. The vehicle system controller 605 can then communicate the verification to the intelligent agent 635, which can then determine one or more movements (e.g., a third travel path) to move the charging connector 205 away from the charging port 305 and return the charging station 200 to a standby or parked position.

Figure 7A:
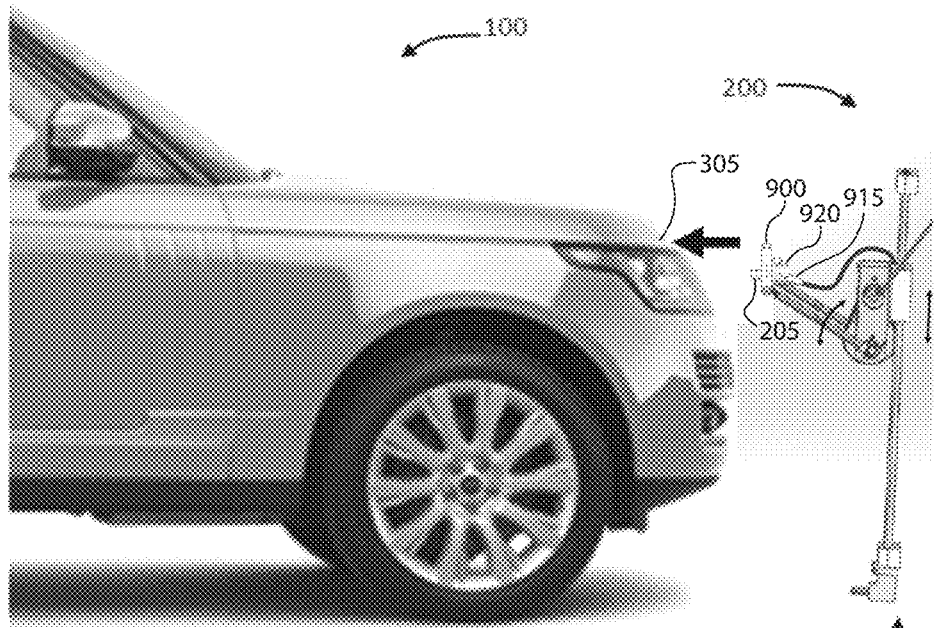
FIG. 7A is a side view of a charging station coupling to a front of a vehicle according to various embodiments.
Figure 7B:
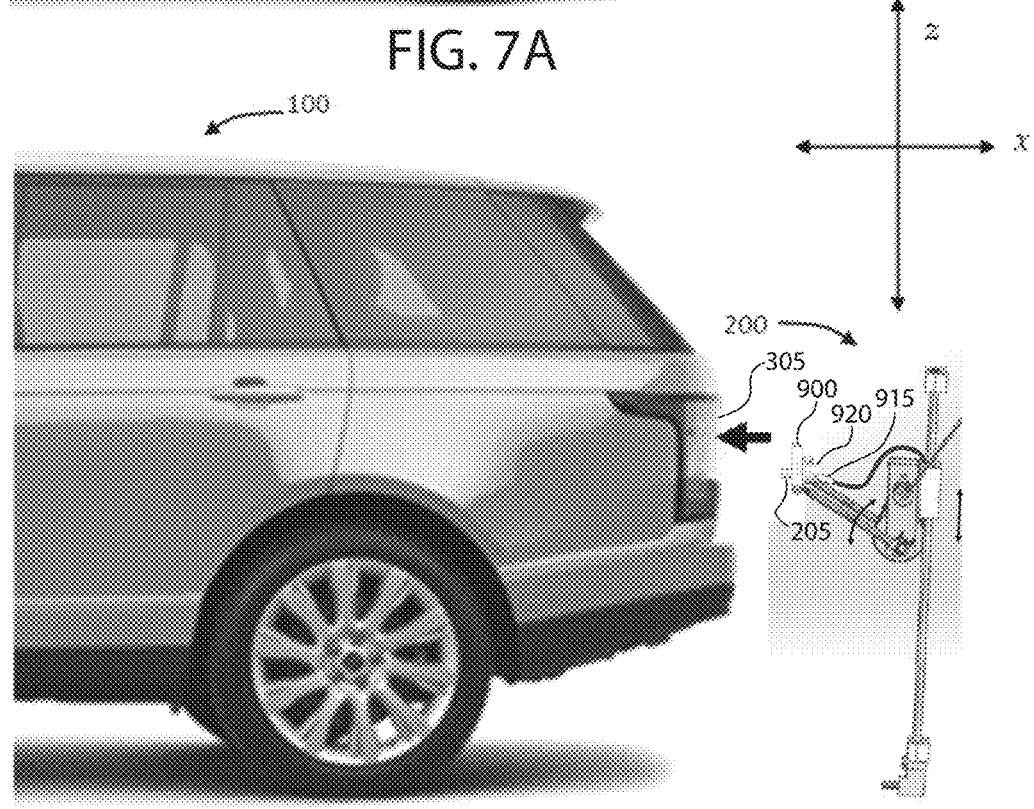
FIG. 7B is a side view of an exemplary charging station coupling to a back of a vehicle according to various embodiments.

FIGS. 7A and 7B, and FIGS. 8-11 illustrate an exemplary charging station 200 according to various embodiments. FIGS. 7A and 7B illustrate that the charging port 305 can be located anywhere on the vehicle 100, such as a front of the vehicle 100 as illustrated in FIG. 7A or a back of the vehicle 100 as illustrated in FIG. 7B. Additionally, the charging port 305 can be positioned on the vehicle 100 at any height along the z-axis so long as the height does not exceed a height of the connection envelope 415 (see FIG. 5).

As will be described in more detail below, FIGS. 7A and 7B illustrate that the charging station may include a mount 900. The mount 900 may be configured to move in the transverse (along the z-axis), the lateral (along the y-axis), and/or the longitudinal (along the x-axis) directions. The mount may be coupled to one or more movable arms. The movable arms may be coupled to one or more actuators configured to move the mount in the transverse (along the z-axis), the lateral (along the y-axis), and/or the longitudinal (along the x-axis) directions.

Figure 9:
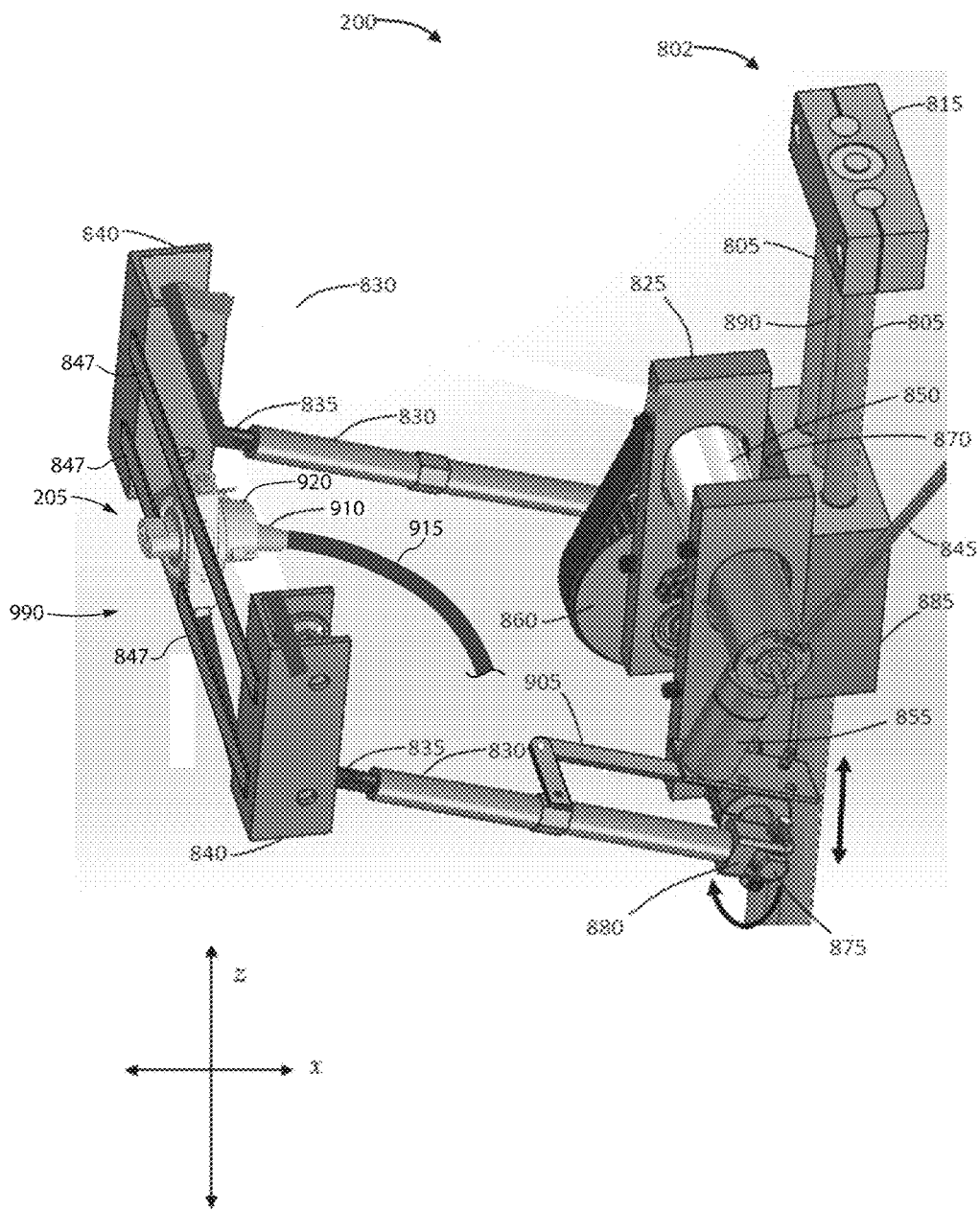
FIG. 9 is a perspective view of an exemplary charging station illustrating movement in the x-axis and the z-axis according to various embodiments.
Figure 10:
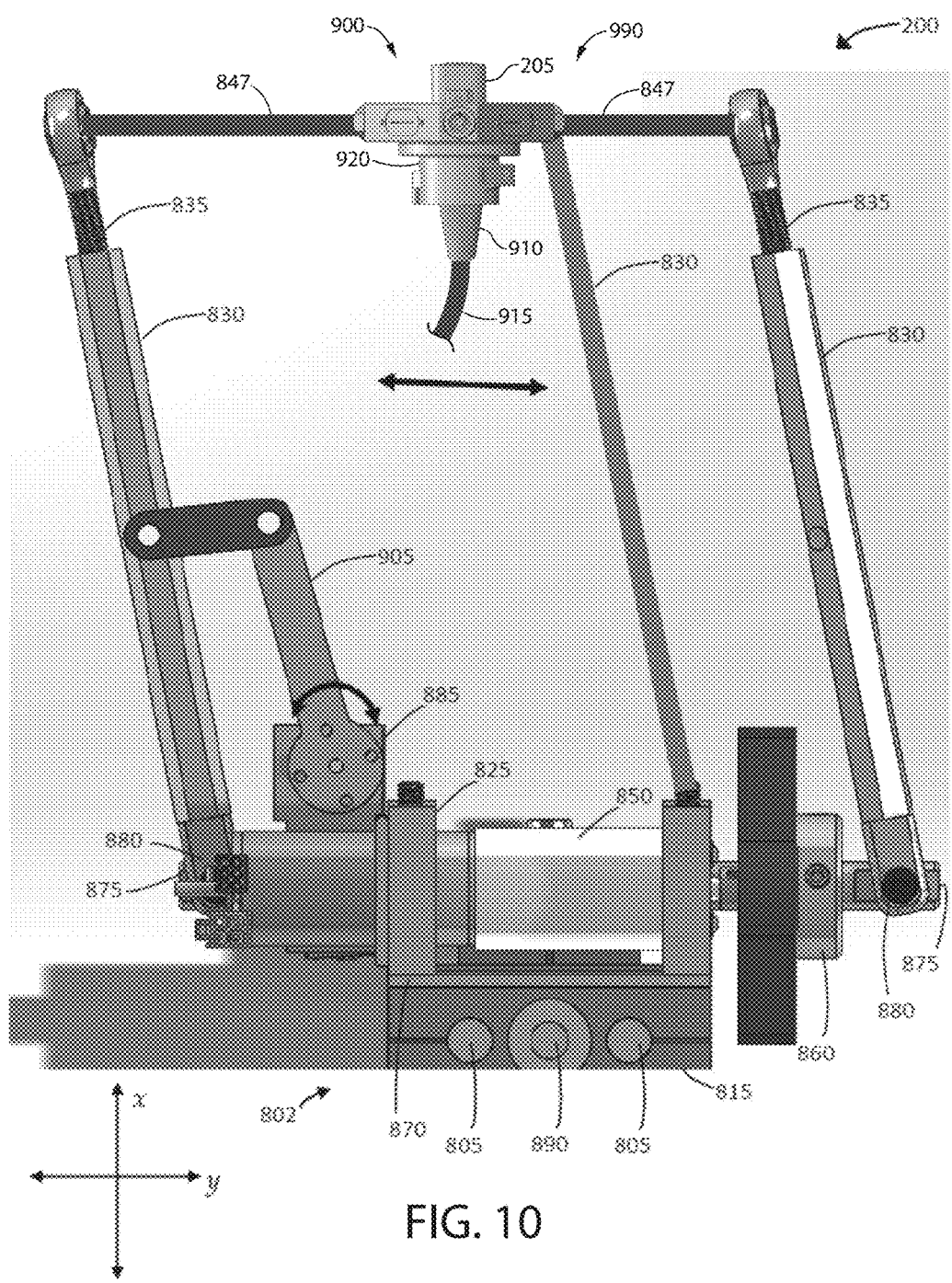
FIG. 10 is a top view of an exemplary charging station illustrating movement in the x-axis and the y-axis according to various embodiments.

In some implementations, the mount 900 is secured to a frame 990 (see, e.g., FIGS. 9-10). The frame may be coupled to one or more movable arms. The movable arms may be coupled to one or more actuators configured to move the frame and the mount in the transverse (along the z-axis), the lateral (along the y-axis), and/or the longitudinal (along the x-axis) directions. The mount and/or frame may be configured such the mount does not move relative to the frame.

A coupling or bracket 920 may be coupled to the mount 900. The bracket 920 may be configured to receive and secure a charging connector 205 to the mount 900 and/or the frame 990. The bracket 920 may be configured such that the charging connector 205 may be removed from the bracket 920, to allow, for example, a driver to manually couple and/or uncouple the charging connector 205 to a vehicle's charge port 305. The charging connector 205 may include a handle 910 that is coupled to a charging cable 915. A charging cable 915 may supply current and/or signals to and from the vehicle 100 and the charging station 200.

When describing the steps and/or components described herein, the term "proximal portion" may refer to the portion of the charging connector 205 configured to couple with a charging port and the term "distal portion" may refer to the handle 910. A "proximal direction" may be the direction extending towards a charging port and the "distal direction" may be the direction that is opposite of the proximal direction. For example, the charging connector 205 may move in a proximal direction to couple with a charging port and may then move in the distal direction to uncouple from the charging port.

Figure 8:
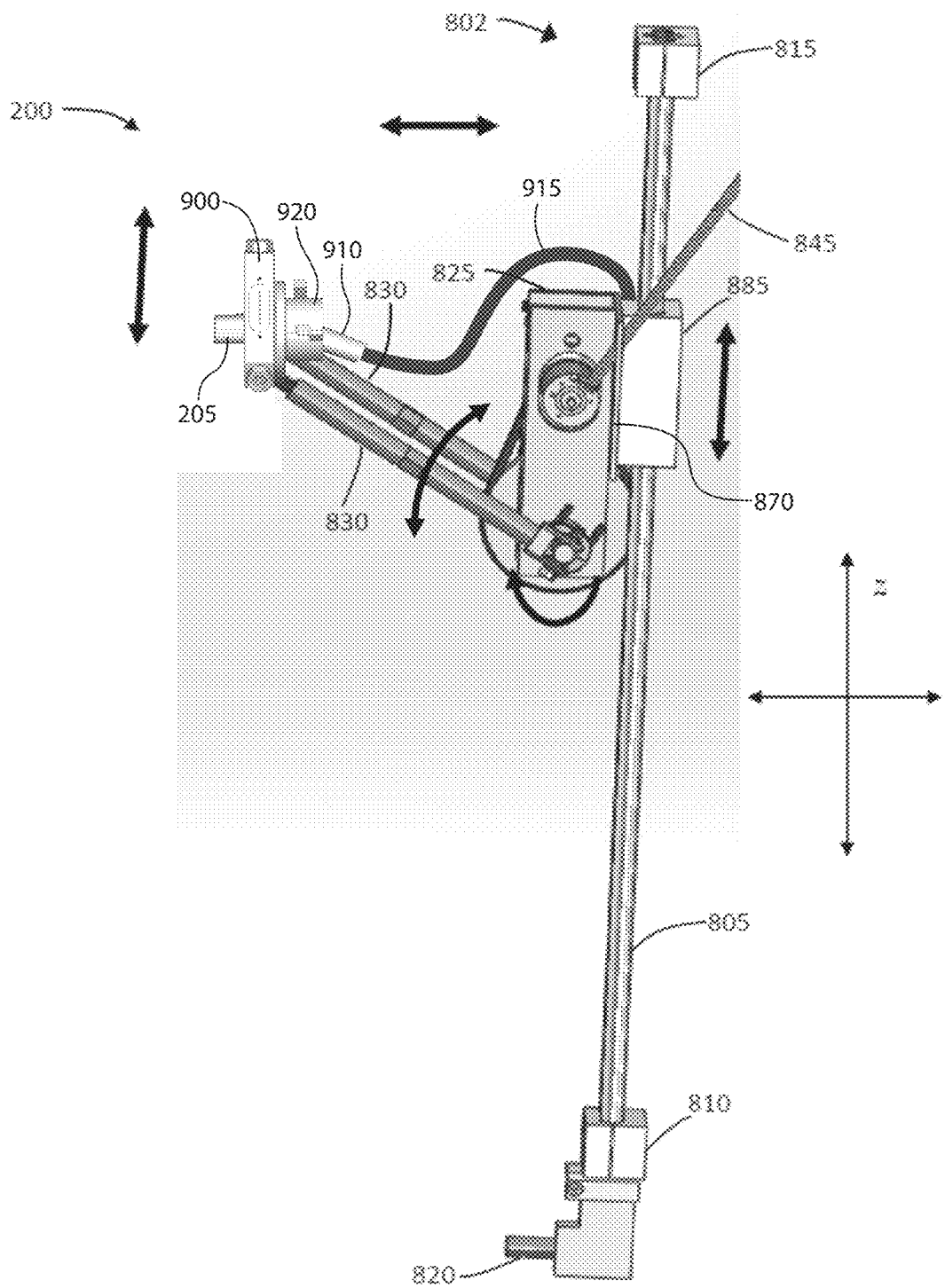
FIG. 8 is a side view of an exemplary charging station illustrating movement in the x-axis and the z-axis according to various embodiments.

Referring now to FIGS. 8-10, the exemplary charging station 200 can comprise a movable frame 990 that secures a mount 900 thereto. The frame 990 may be configured to move the mount 900 through three-dimensional space in the lateral, longitudinal, and/or transverse direction. The mount 900 may be configured to hold a bracket 920 and move the bracket 920 through three-dimensional space in the lateral, longitudinal, and/or transverse direction.

One or more vertical guide arms 805 can extend between the lower and upper mounting blocks 810, 815. Some embodiments can further comprise a linear actuator 885 riding on the one or more vertical guide arms 805 and driven by a vertical linear actuator shaft 890 to provide movement along the z-axis. The vertical linear actuator shaft 890 can be oriented parallel to the one or more vertical guide arms 805 and held in place by the lower and upper mounting blocks 810, 815. A first plate 870 can be coupled to the linear actuator 885 and can travel along with the linear actuator 885 along the z-axis. The first plate 870 can be oriented in the y-z plane. As will be described in greater detail below, the linear actuator 885 can translate the frame 990, mount 900, bracket 920, and charging connector 205 in the z-direction in order to help align the charging connector 205 to the vehicle's charge port.

The charging connector 205 may include one or more electrically contactors configured to transmit AC or DC current. The charging connector 205 may also include one or more data contactors. The data contactors may be configured to couple with one or more data contactors within the vehicles charge port. In this way, data such as charging information, battery temperature, internal cabin temperature of the vehicle, and the like may be transmitted from the vehicle to the charging station. In other embodiments, the charging station and the vehicle may be configured transmit data wirelessly with one another. The mounting system 802 can further comprise a power cable 845 for delivering an electrical current to the charging connector 205.

Figure 11:
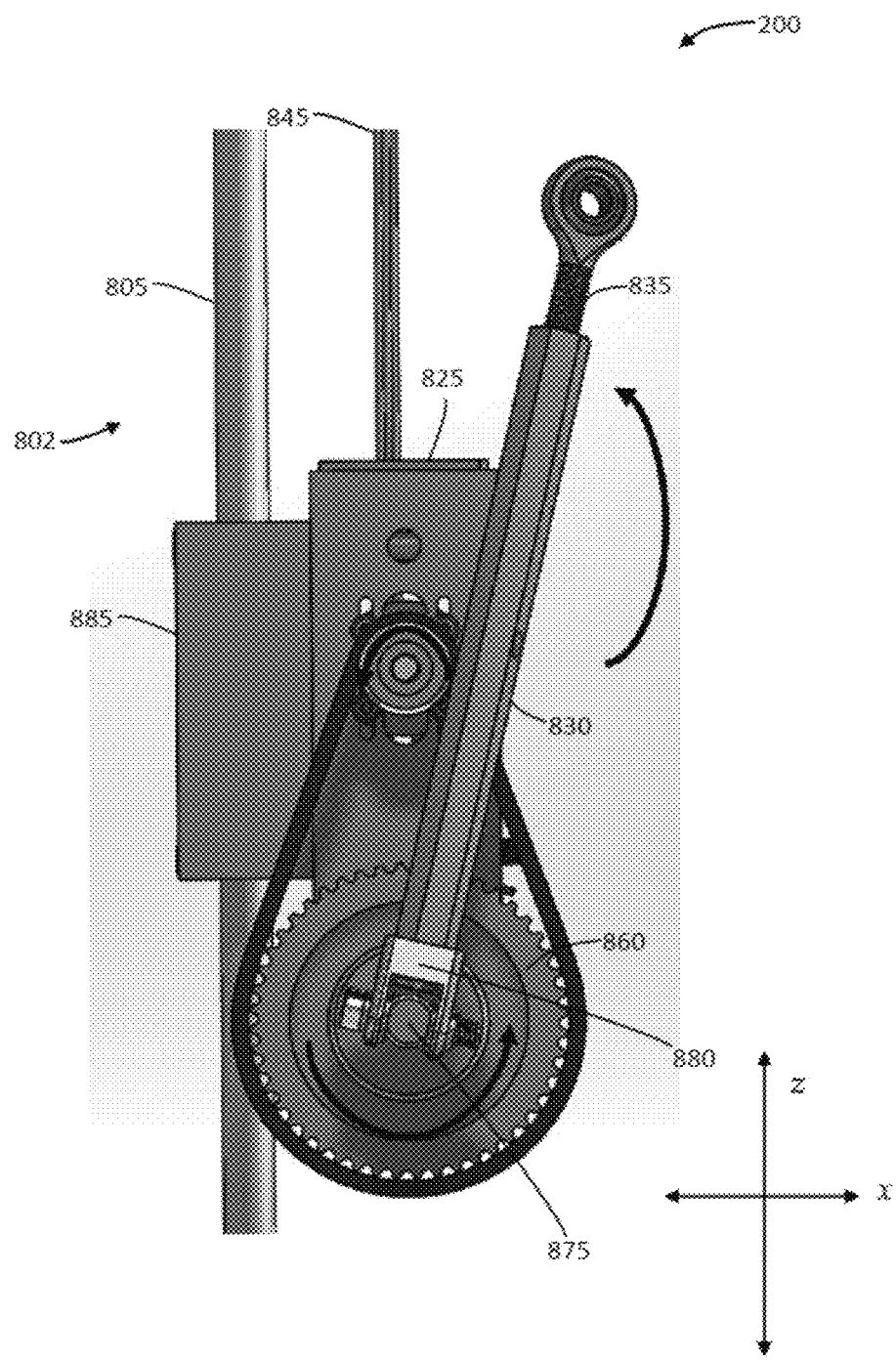
FIG. 11 is a side view of an exemplary charging station in a parked position according to various embodiments.

The charging station 200 may also include an actuator unit 825 comprising one or more actuators to affect further movement of the frame 990, the mount 900, the bracket 920, and the charging connector 205. The actuator unit 825 can be coupled to the first plate 870. As best shown in FIG. 11, the actuator unit 825 may comprise a rotatable shaft 875 oriented along the y-axis. Each end of the shaft 875 may be coupled to horizontal arms 830 by a pivotable joint 880. The pivotable joints 880 may be clevis joints which use bronze bushings to allow for low sliding friction and low-tolerance moving parts, although it is to be understood that other suitable pivot joints may be used. Horizontal arm lead screws 835 may extend outward from an end of each horizontal arm 830 opposite the pivotable joint 880. The lead screws 835 can be driven from within the horizontal arm 830 such that the lead screw 835 is extendable and retractable along an axis of the horizontal arms 830. As shown, each of the lead screws 835 can be coupled to the fixture blocks 840.

As shown in FIGS. 9-10, the frame 990 may comprise fixture blocks 840 and one or more supports 847. The supports 847 may comprise rods, arms, poles, plates, connectors, and the like. In general the frame 990 is coupled to one or more support arms 830 that are configured to move the frame 990 along the x, y, and z axes. While the arms 830 are described as using a plurality of actuators that independently drive the arms 830 along the x, y, and z axes, other solutions are contemplated. For example, a single motor may be configured to move a single arm in three dimensional space. In another example, an articulating arm with a plurality of movable joints is utilized. The frame 990 may be further configured such that the frame 990 secures the mount 900 relative to the frame 990 such that the movement of the mount 900 with respect to the frame 990 is inhibited and/or prevented. Thus, in some aspects, the frame 990 and the mount may be configured to move as one.

Continuing with FIGS. 8-11, in various embodiments, the actuator unit 825 can comprise a first actuator 850 coupled to a belt and pulley mechanism 860. The pulley can be coupled to a shaft 875 such that when the first actuator 850 moves the belt, the pulley rotates and causes the shaft 875 to rotate. The shaft 875 uses ball bearings for shaft support and low rolling resistance. The rotational movement of the shaft 875 can cause the horizontal arms 830 to move up or down as indicated by the vertical arrow in FIG. 8, thereby changing the position of the frame 990, mount 900, bracket 920, and the charging connector 205 along the z-axis. The rotational movement of the shaft 875 causes the horizontal arms 830 to translate the position of the frame 990, mount 900, bracket 920, and the charging connector 205 along an arc in the z-x plane. Thus, the movement of the shaft 875 may also cause the frame 990, mount 900, bracket 920, and the charging connector 205 to change position along the x and z axes.

The actuator unit 825 can further comprise a second actuator 855 coupled to one of the horizontal arms 830 by a linkage mechanism 905. The second actuator 855 can cause one of the linkages in the linkage mechanism 905 to move in an arc as indicated in FIG. 10. Movement of the linkage mechanism 905 can cause the horizontal arms 830 to move left and right along the y-axis as viewed in FIG. 10. In this way, the frame 990, mount 900, bracket 920, and charging connector 205 can be moved in the y-direction in order to help align the charging connector 205 to the vehicle's charge port.

As shown in FIG. 10, the charging station 200 can further comprise at least one additional horizontal arm 830 coupled to the actuator unit 825 (or alternatively to the first plate 870) and the frame 990 (or alternatively the mount 900). The third horizontal arm 830 can provide additional structural support and resist twisting of the structure formed by the other two horizontal arms 830 and the frame 990 and/or the mount 900. The first plate 870 and the frame 990 and/or the mount 900 may be kept parallel by the combination of the horizontal arms 830.

As described previously, the charging station system controller 640 can direct the first and second actuators 850, 855 and/or the lead screws 835 to initiate movements such that the charging connector 205 is positioned in contact with the charging port 305 when the charging port 305 is positioned within the connection envelope 415.

FIG. 11 illustrates the charging system 200 in a parked or stand-by position where the horizontal arms 305 are rotated by the first actuator 850 to a maximum upward (or alternatively, downward) position. This parked position can allow more unencumbered movement around the charging station 200 when not in use. Power cord 845 can provide electrical power to the actuators 850, 855, the lead screws 835, and the linear actuator 885.

Figure 12:
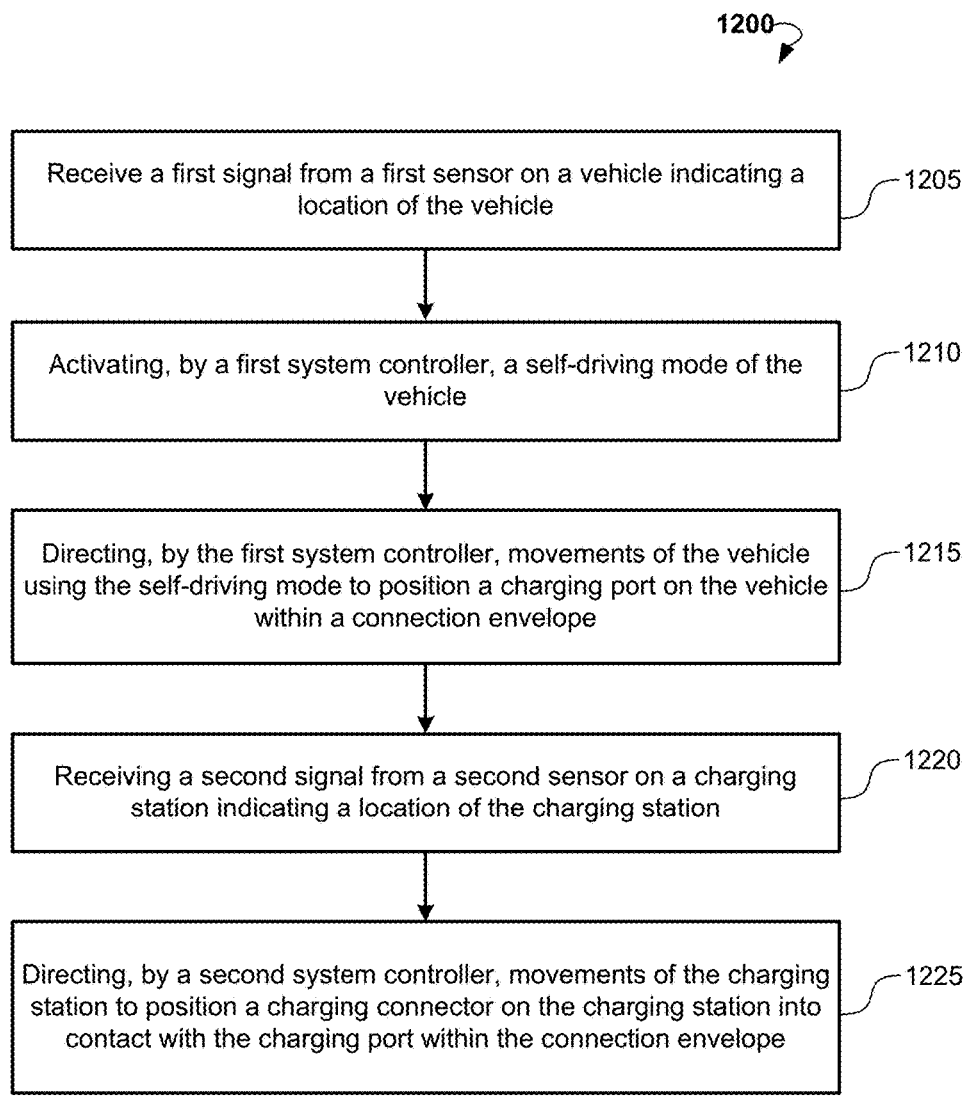
FIG. 12 is a flow diagram of an exemplary method for autonomous connection of a charging station to a vehicle according to various embodiments.

FIG. 12 is a flowchart of an exemplary method 1200 for autonomous connection of a charging station 200 to a vehicle 100 according to various embodiments. At step 1205, a first signal can be received from a first sensor 410 on the vehicle 100. The signal can indicate a location of the vehicle 100. At step 1210, a first system controller 605 can activate a self-driving mode of a vehicle self-driving system 620, and at step 1215 direct movements of the vehicle 100 using the self-driving mode to position a charging port 305 on the vehicle 100 within a connection envelope 415. At step 1220, a second signal can be received from a second sensor 405 on the charging station 200 indicating a location of the charging station 200. A second system controller 640 can direct movements of the charging station 200 to position a charging connector 205 on the charging station 200 into contact with the charging port 350 within the connection envelope 415 at step 1225.

Figure 13:
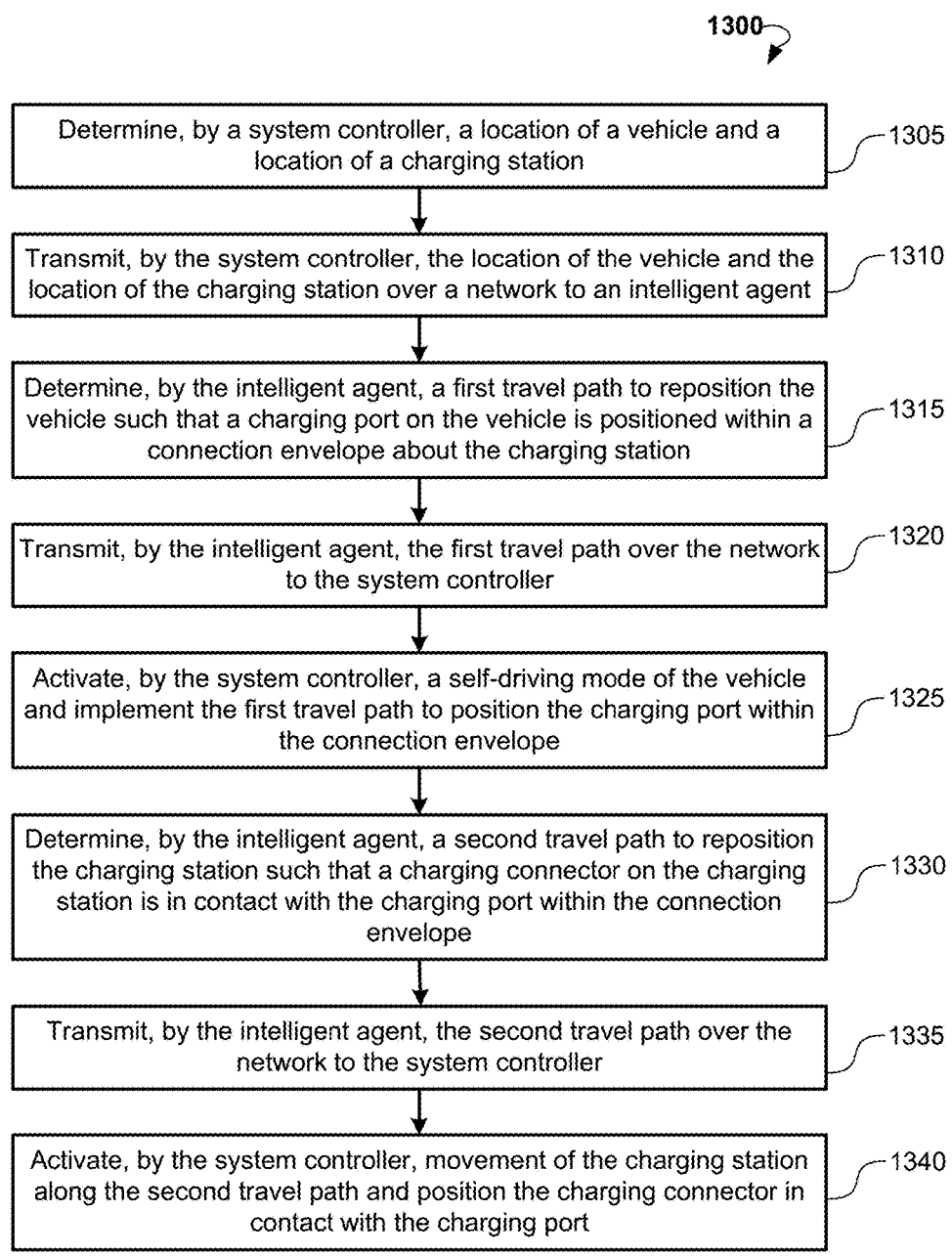
FIG. 13 is another flow diagram of an exemplary method for autonomous connection of a charging station to a vehicle according to various embodiments.

FIG. 13 is a flow chart of an exemplary method 1300 for autonomous connection of a charging station 200 to a vehicle 100 according to various embodiments. At step 1305, a system controller 605 can determine a location of the vehicle 100 and a location of the charging station 200. The system controller 605 can transmit the locations of the vehicle 100 and the charging station 200 over a network 630 to an intelligent agent 635 at step 1310. The intelligent agent 635 can determine at step 1315 a first travel path to reposition the vehicle 100 such that a charging port 305 on the vehicle 100 is positioned within a connection envelope 415 about the charging station 200. At step 1320, the intelligent agent 635 can transmit the first travel path over the network 630 to the system controller 605. At step 1325, the system controller 605 can activate a self-driving mode of a vehicle self-driving system 620 and implement the first travel path to position the charging port 305 within the connection envelope 415. At step 1330, the intelligent agent 635 can determine a second travel path to reposition the charging station 200 such that a charging connector 205 on the charging station 200 is in contact with the charging port 305 within the connection envelope 415. At step 1335, the intelligent agent 635 can transmit the second travel path over the network 630 to the system controller 605. The system controller 605 can activate movement of the charging station 200 along the second travel path and position the charging connector 205 in contact with the charging port 305 within the connection envelope 415 at step 1340.

Turning to FIGS. 14-18, details of the mount 900 and bracket 920 are illustrated. In general, the bracket 920 inhibits or prevents movement of the charging connection 205 with respect to the bracket 920. As will be described in more detail below, the mount 900 and/or bracket 920 may be configured such that the bracket 920 may move limited set distances in any direction with respect to the mount 900. When the mount 900 is secured to a frame 990, the bracket 920 may be configured to move limited set distances in any direction with respect to the frame 900 as well.

In some aspects the mount 900 and/or bracket 920 are configured such that the bracket 920 may rotate and/or translate in the x, y, and z directions with respect to the mount 900. In some aspects the mount 900 and/or bracket 920 are configured such that the bracket 920 and a charging connection 205 secured within the bracket 920 may pitch, roll, and yaw at least 5° in each direction with respect to the mount 900. In some aspects the mount 900 and/or bracket 920 are configured such that the bracket 920 and a charging connection 205 secured within the bracket 920 may translate a fixed distance (e.g., at least 1 cm) in each of the x, y, and z directions with respect to the mount 900.

In operation, the mount 900 may be moved relative to the vehicle such that the charging connection 205 is substantially aligned with the vehicle's charge port at least along the y and z axes. The mount 900 may then be thrust forward in the x-direction and toward the vehicle charge port. The charging connector 205 may then abut against one or more surfaces of the charge port. The mount 900 and/or bracket 920 may allow for the charging connection 205 to move slightly with respect to the mount 900 (and/or frame 990) in order to avoid damaging the charging connection 205 and/or charge port 305. The mount 900 and/or bracket 920 may also allow function as a shock absorber—dampening the impact between the charging connection 205 and the charge port 305. The mount 900 and/or bracket 920 may also allow for a greater margin of error in the alignment of the charging connection 205 with the charge port 305 and or allow for a greater a margin of error in the distance that the frame 990 and/or mount 900 moves the charging connector 205 along the x-axis.

Figure 14:
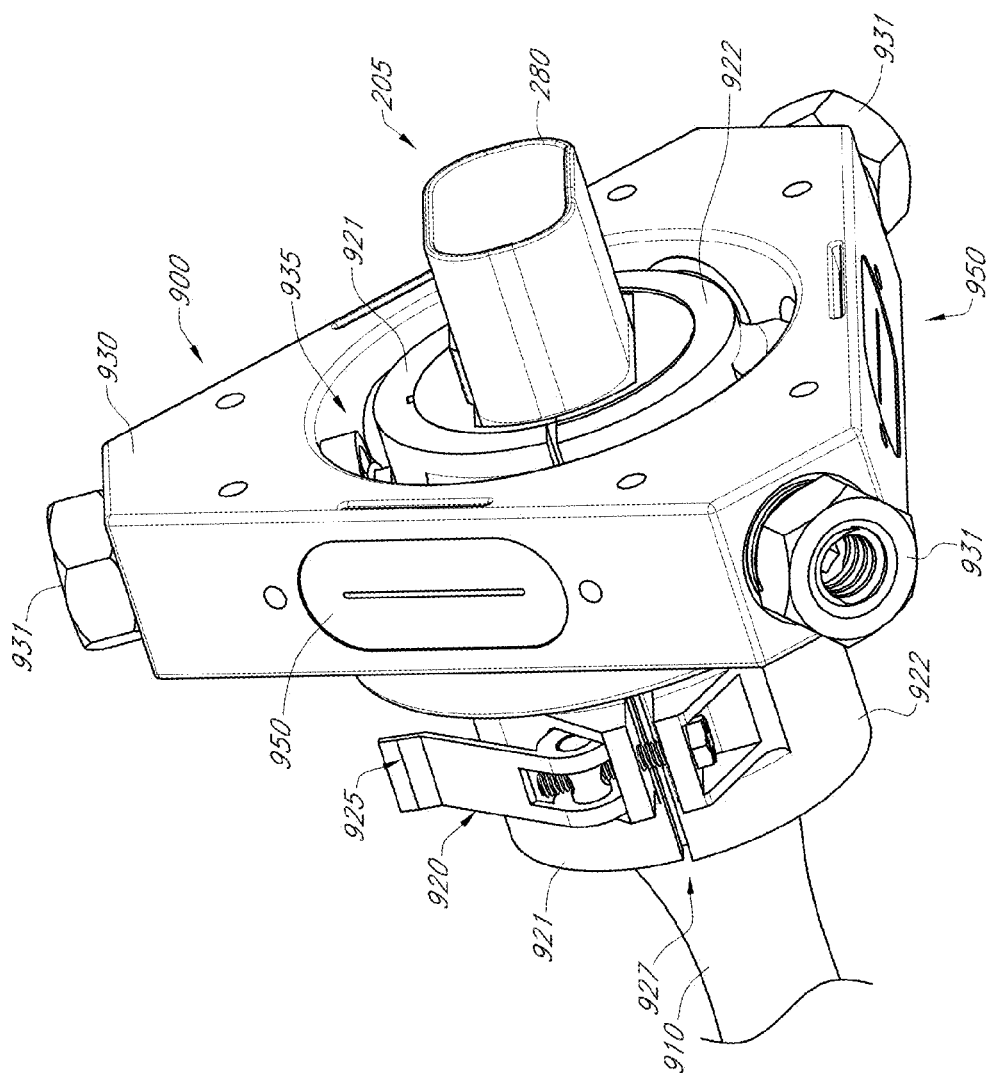
FIG. 14 is a perspective view of charging connector secured within a bracket that is positioned in a mount.

FIG. 14 depicts a perspective view of a bracket 920 coupled to a mount 900 according to an example implementation. As described above, the mount 900 may be secured to a frame 990. The frame 990 may be coupled to one or more movable arms that are configured to move the frame 990 in at least three dimensions. In other implementations, the mount 900 may be coupled to one or more movable arms that are configured to move the mount 900 in at least three dimensions.

As shown in FIG. 14, a charging connection 205 is secured within the bracket 920. The charging connection 205 may include a handle 910. The charging connection 205 may be coupled to a cable (not shown). The connection face 280 of the charging connection 205 may include one or more male and/or female connectors configured to mate with one or more corresponding male and/or female connectors on the face of the charge port.

The bracket 920 may have a generally cylindrical shape formed by two generally cylindrical halves 921, 922. In some implementations, the two generally cylindrical halves 921, 922 are coupled together by a hinge 928 (see FIG. 18A) on one side and a releasable fastener 925 on the other side. That is to say, the bracket 920 may open and close along a joint line 927. When the releasable fastener 925 is placed in the unlocked position, the bracket 920 may at least partially open along joint line 927 and the charging connection 205 may be removed from the bracket 920 by pulling the handle 910 and cable (not shown) through the bracket 920 such that the cable remains in the bracket 920. The charging connection 205 may also be removed in the opposite direction. In this way, the cable will not pass through the bracket 920.

When the charging connection 205 is inserted into the bracket 920, the releasable fastener 925 may be placed in the locked position, and the charging connection 205 may be secured within the bracket. Thus, the movement of the charging connection 205 with respect to the bracket 920 may be inhibited or prevented.

Figure 15:
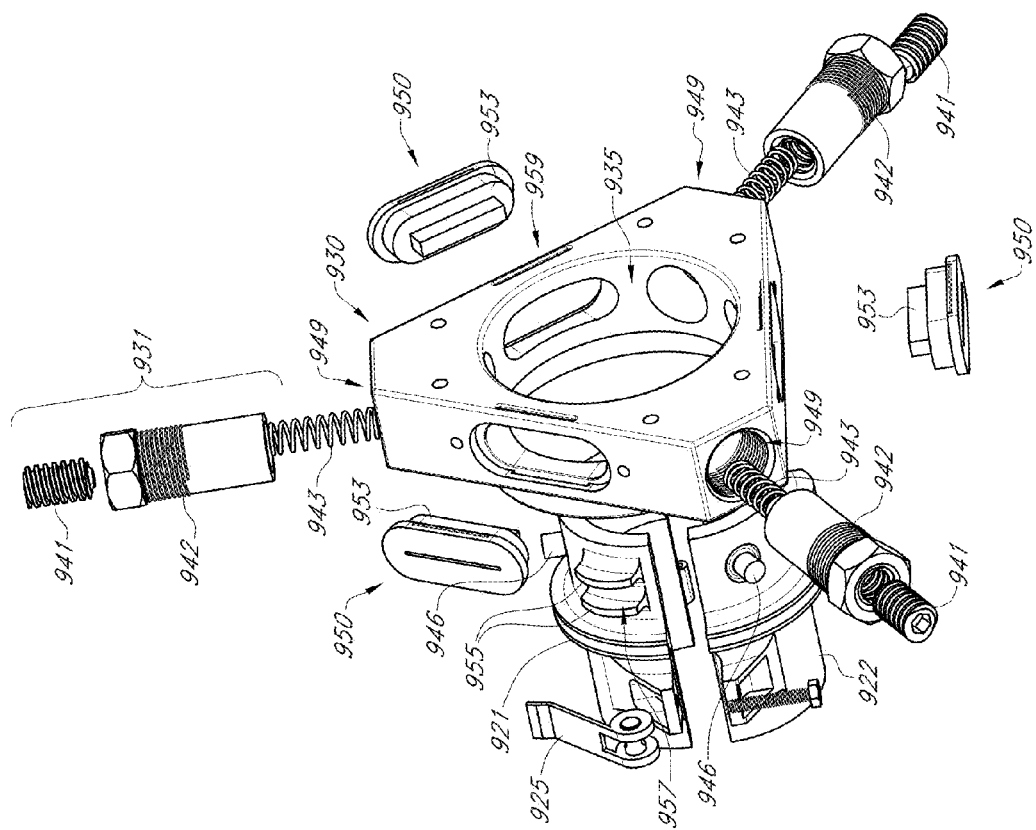
FIG. 15 is an exploded perspective view of the bracket and mount from FIG. 14.

FIG. 15 depicts an exploded view of FIG. 14, with the charging connection 205 removed. As shown, the mount 900 may include a body 930 having a plurality of openings extending therethrough. A central opening 935 may be sized and shaped to receive at least a portion of the bracket 920.

A plurality of spring couplings 931 may be used to couple the bracket 920 to the mount 900. The spring couplings 931 may be configured to suspend the bracket within the central opening 935. The spring couplings 931 may also be configured to allow the bracket 920 to move towards and away from the body 930 of the mount 900. The amount of movement between the bracket 920 and the body 930 of the mount 900 may be limited or enhanced by adjusting the tension in the springs 943.

The spring couplings 931 may include a spring 943 that is fit through a bolt 942. A set screw 941 may be also fit through the bolt 942 and may be used to adjust the tension in the spring 943. The spring couplings 931 may extend through the body 930 through openings 949 and secured to protrusions 946 extending from the bracket 920. As shown, at least three spring couplings 931 are used to couple the bracket 920 to the mount 900. However, additional spring couplings 931 may be used. In some implementations, the bolt 942 is integral to the body 930. In other implementations, the openings 949 may include threading that is complementary to threading on the bolts 942. The bolts 942 and/or portions of the body 930 can be sized larger or smaller to accommodate different spring diameters and lengths—thus further allowing for spring 943 adjustment.

Figure 18A:
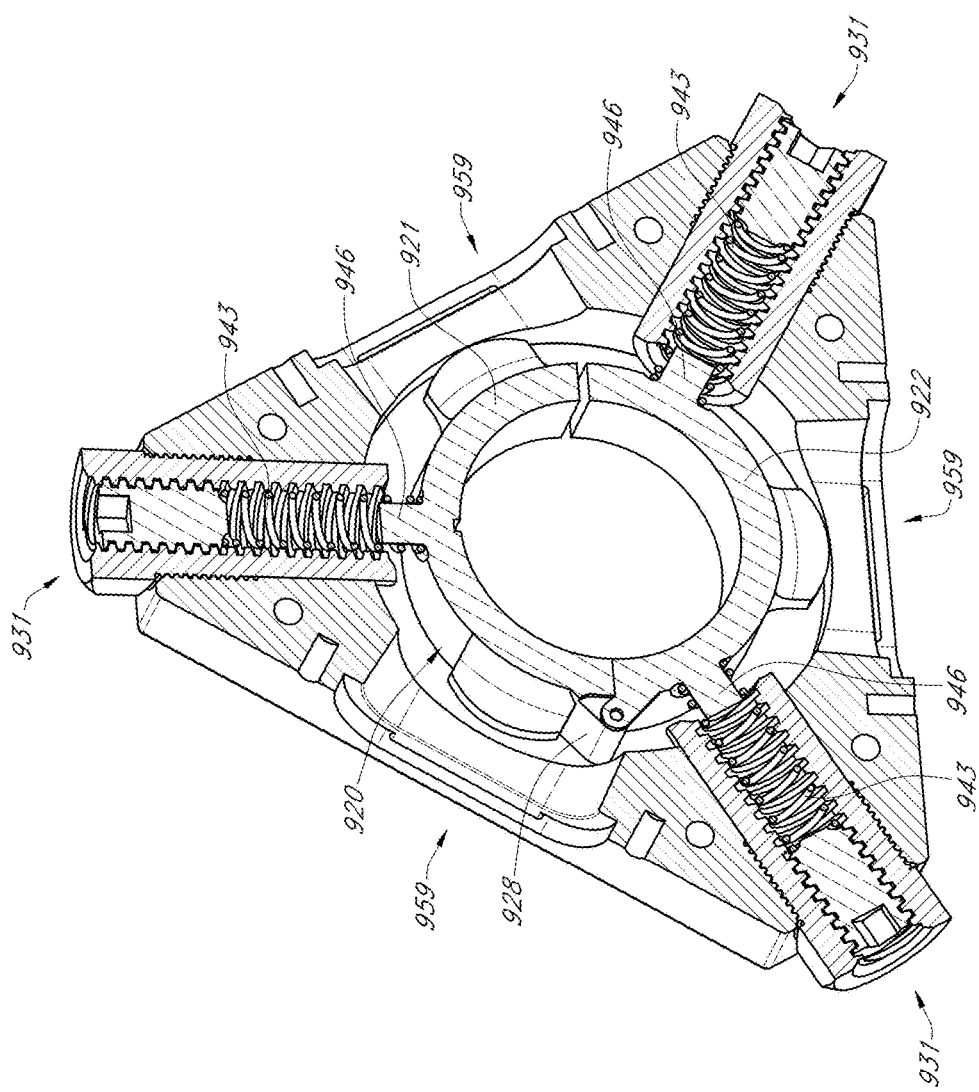
FIG. 18A is a partial cross-section view of the bracket and mount of FIG. 17 taken about the line 18A-18A.

Turning briefly to FIG. 18A, the functionality of the spring couplings 931 can be appreciated. FIG. 18A illustrates a cross section of the bracket 920 that is coupled to the mount 900 by the spring couplings 931. Thus, the bracket 920 can move with respect to the mount 900. For example, the bracket 920 may translate in any radial direction towards and away from the body 930 of the mount 900. The bracket 920 may also translate axially with respect to the mount 900 (e.g., in and out of the mount 900). The bracket 920 may also be able to slightly rotate about an axis extending through the center of the bracket 920. These relative movements may be adjusted by adjusting the tension of the spring couplings 931 to allow for more or less play of the bracket 920 within the mount 900.

The axial movement (e.g., in and out of the mount 900) of the bracket 920 with respect to the mount 900 may be limited by the interaction of at least two walls 955 extending from the bracket 920 and at least one abutment 953 extending from the mount 900 and positioned in between the walls 955. As shown, for example, in FIG. 15, the abutments 953 may protrude from trays 950 that are insertable into openings 959 in the body 930 of the mount 900. The trays 950 may be configured to snap-fit with the openings 959 in the body 930. In this way, the trays 950 may be easily removed for releasing the bracket 920. The walls 955 may form a receiving space 957 for an abutment 953. As shown in FIG. 15, the mount 900 may include three abutments 953. However, more or less abutments 953 may be implemented.

Figure 18B:
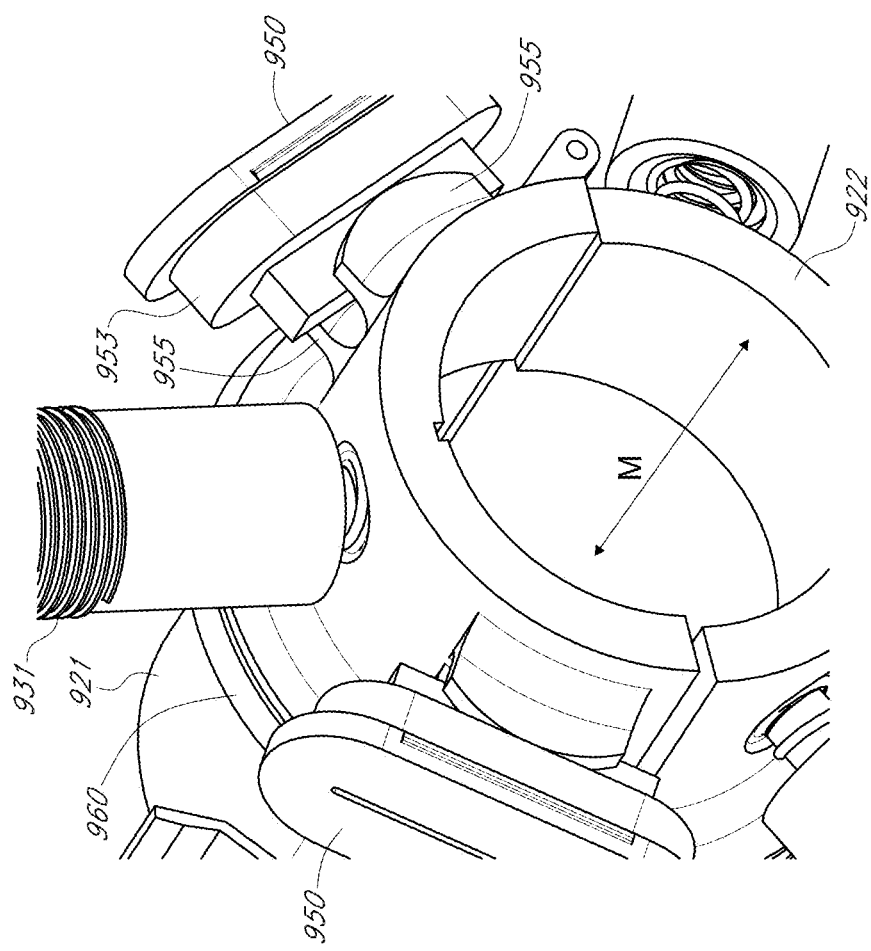
FIG. 18B is a partial perspective view illustrating the interaction of the bracket and mount of FIG. 14 when the bracket is moved in the axial direction with respect to the mount.

Turning to FIG. 18B, the functionality of the walls 955 and abutments 953, may be appreciated. FIG. 18B illustrates the bracket 920 suspended in the central opening 935 of the mount 900 with spring couplings 931. The trays 950 are shown in the position that they would be inside the body 930, although the body 930 is not shown. As described above, the bracket 920 may move in the axial direction "M" with respect to the mount 900. The walls 955 and abutments 953 thus limit the axial movement in the proximal and distal direction. The thickness of the abutments 953 may be changed to vary the distance that the bracket 920 can travel axially with respect to the mount 900.

Figure 16:
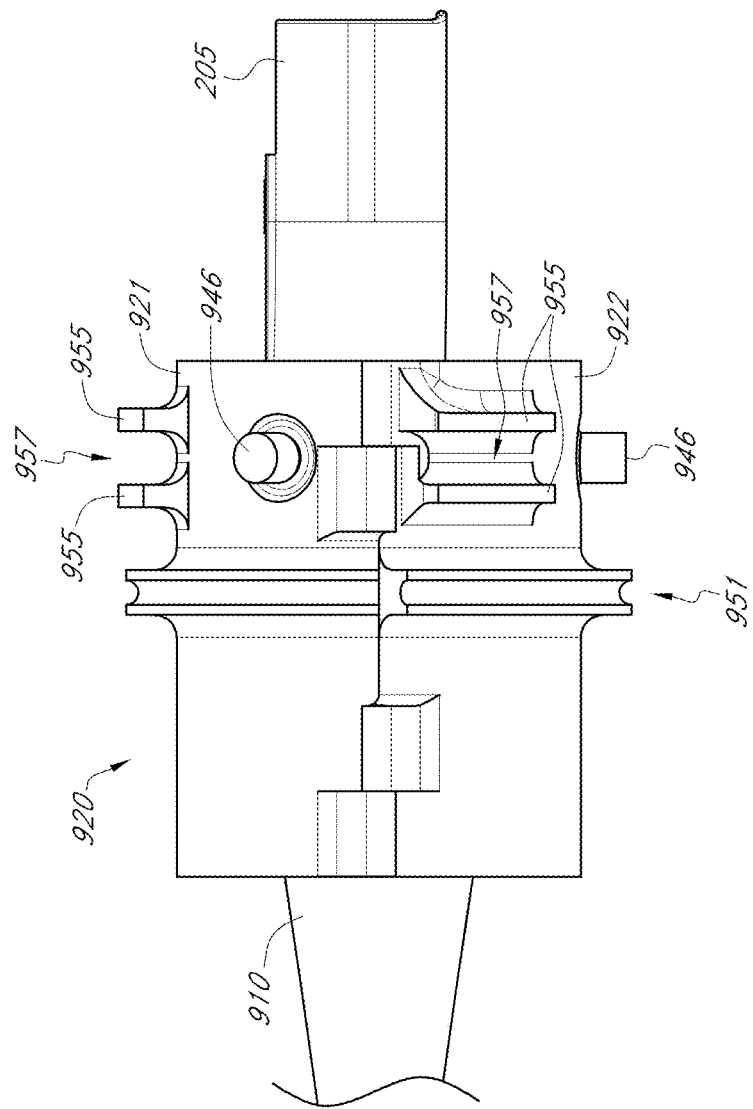
FIG. 16 is a side view of the charging connector and bracket from FIG. 14.
Figure 17:
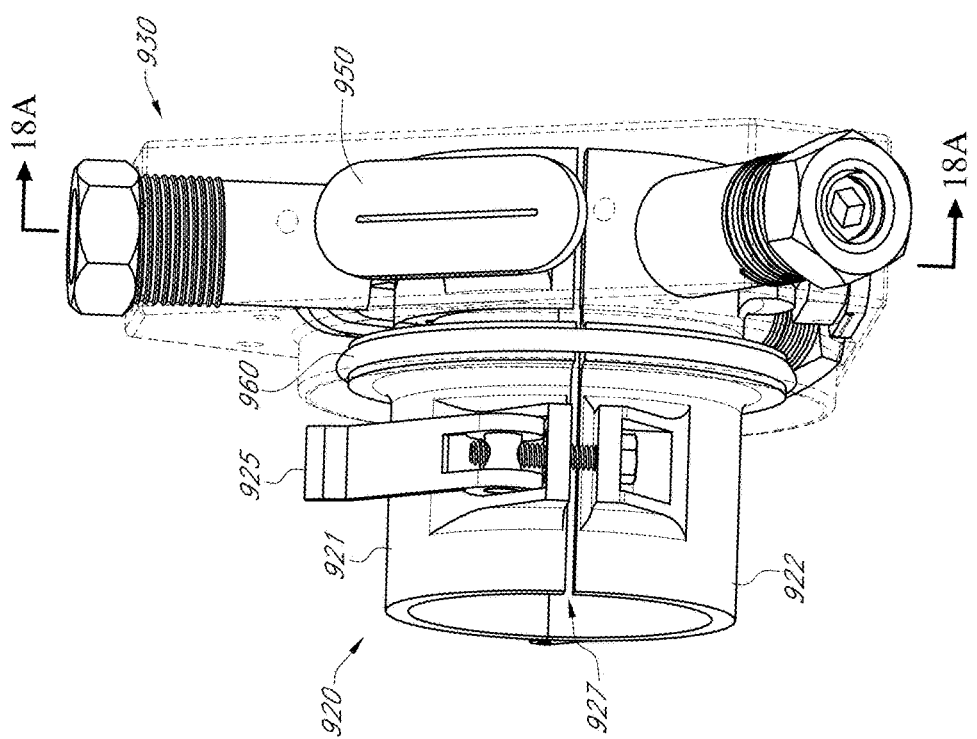
FIG. 17 is a perspective view of the bracket and the mount of FIG. 14. A portion of the mount is transparent in order to illustrate the O-ring on the bracket.

FIG. 16 illustrates the charging connection 205 secured within the bracket 920. The bracket 920 and/or the mount 900 may include a spring, a dampener, or an element having higher frictional surface than the bracket 920 and/or the mount 900. For example, as shown in FIG. 16, the bracket 920 may include an annular groove 951 for receiving an O-ring (not shown). The O-ring 960 may be seen in FIG. 17. The O-ring 960 may help balance the bracket 920 within the center of the opening 935 of the mount 900. The portion of the O-ring 960 that is not within the annular groove may be secured to the mount. The O-ring 960 may resist movement of the bracket 935 with respect to the mount 900 and/or dampen impact during the coupling of the charging connection 205 with a vehicle's charge port.

According to various embodiments, the vehicle system controller 605 and the charging station system controller 640 can communicate with a cloud-based computing environment that collects, processes, analyzes, and publishes datasets. In general, a cloud-based computing environment is a resource that typically combines the computational power of a large grouping of processors and/or that combines the storage capacity of a large group of computer memories or storage devices. For example, systems that provide a cloud resource can be utilized exclusively by their owners, such as Google™ or Amazon™, or such systems can be accessible to outside users who deploy applications within the computing infrastructure to obtain the benefits of large computational or storage resources.

The cloud can be formed, for example, by a network of web servers with each server (or at least a plurality thereof) providing processor and/or storage resources. These servers can manage workloads provided by multiple users (e.g., cloud resource customers or other users). Typically, each user places workload demands upon the cloud that vary in real-time, sometimes dramatically. The nature and extent of these variations typically depend upon the type of business associated with each user.

Some of the above-described functions can be composed of instructions that are stored on storage media (e.g., computer-readable media). The instructions can be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire, and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic media, a CD-ROM disk, digital video disk (DVD), any other optical media, any other physical media with patterns of marks or holes, a RAM, a PROM, an EPROM, an EEPROM, a FLASHEPROM, any other memory chip or data exchange adapter, a carrier wave, or any other media from which a computer can read.

Various forms of computer-readable media can be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

While the present disclosure has been described in connection with a series of preferred embodiments, these descriptions are not intended to limit the scope of the disclosure to the particular forms set forth herein. The above description is illustrative and not restrictive. Many variations of the embodiments will become apparent to those of skill in the art upon review of this disclosure. The scope of this disclosure should, therefore, be determined not with reference to the above description, but instead should be determined with reference to the appended claims along with their full scope of equivalents. The present descriptions are intended to cover such alternatives, modifications, and equivalents as can be included within the spirit and scope of the disclosure as defined by the appended claims and otherwise appreciated by one of ordinary skill in the art. In several respects, embodiments of the present disclosure can act to close the loopholes in the current industry practices in which good business practices and logic are lacking because it is not feasible to implement with current resources and tools.

Spatially relative terms such as "under," "below," "lower," "over," "upper," and the like, are used for ease of description to explain the positioning of one element relative to a second element. These terms are intended to encompass different orientations of the device in addition to different orientations than those depicted in the figures. Further, terms such as "first," "second," and the like, are also used to describe various elements, regions, sections, etc. and are also not intended to be limiting. Like terms refer to like elements throughout the description.

As used herein, the terms "having," "containing," "including," "comprising," and the like are open ended terms that indicate the presence of stated elements or features, but do not preclude additional elements or features. The articles "a," "an" and "the" are intended to include the plural as well as the singular, unless the context clearly indicates otherwise.

The various embodiments described above, in accordance with the present invention, provide a means to couple a charging station's charging connection to a EV's charging port. Although this invention has been disclosed in the context of certain embodiments and examples, it will be understood by those skilled in the art that the present invention extends beyond the specifically disclosed embodiments to other alternative embodiments and/or uses of the invention and obvious modifications and equivalents thereof. Thus, it is intended that the scope of the present invention herein disclosed should not be limited by the particular disclosed embodiments described above.

Furthermore, the skilled artisan will recognize the interchangeability of various features from different embodiments. For example, the features of the charging station disclosed in the various embodiments can be switched between embodiments. In addition to the variations described herein, other known equivalents for each feature can be mixed and matched by one of ordinary skill in this art to construct analogous systems and techniques in accordance with principles of the present invention.

It is to be understood that not necessarily all objects or advantages may be achieved in accordance with any particular embodiment of the invention. Thus, for example, those skilled in the art will recognize that the invention may be embodied or carried out in a manner that achieves or optimizes one advantage or group of advantages as taught herein without necessarily achieving other objects or advantages as may be taught or suggested herein.

What is claimed is:

1. A charging station for an electric vehicle comprising:
    a mount configured to move in the longitudinal, lateral, and transverse directions with respect to the vehicle, wherein the mount includes an opening; and
    a charging connector secured within the opening of the mount by a plurality of spring couplings, the couplings configured to permit the charging connector to move independently in radial directions with respect to the mount, the charging connector configured to couple with the vehicle's charge port.

2. The charging station of claim 1, wherein the coupling is configured to permit the charging connector to move a fixed distance in the axial direction with respect to the mount.

3. The charging station of claim 1, further comprising one or more actuators coupled to the mount by one or more arms.

4. The charging station of claim 3, further comprising circuitry for controlling the one or more actuators.

* * * * *